US007974477B2

(12) United States Patent
Shi et al.

(10) Patent No.: US 7,974,477 B2
(45) Date of Patent: Jul. 5, 2011

(54) APPARATUS AND METHOD FOR REVERSIBLE DATA HIDING FOR JPEG IMAGES

(75) Inventors: Yun Qing Shi, Millburn, NJ (US); Guorong Xuan, Shanghai (CN)

(73) Assignee: New Jersey Institute of Technology, Newark, NJ (US)

( * ) Notice: Subject to any disclaimer, the term of this patent is extended or adjusted under 35 U.S.C. 154(b) by 892 days.

(21) Appl. No.: 11/676,399

(22) Filed: Feb. 19, 2007

(65) Prior Publication Data

US 2008/0199093 A1 Aug. 21, 2008

(51) Int. Cl.
*G06K 9/36* (2006.01)
(52) U.S. Cl. ........ 382/232; 382/100; 382/251; 382/169; 382/235
(58) Field of Classification Search .................. 382/232, 382/162, 100, 251, 235, 248, 169
See application file for complete search history.

(56) References Cited

U.S. PATENT DOCUMENTS

| | | | | |
|---|---|---|---|---|
| 5,727,092 | A * | 3/1998 | Sandford et al. | 382/251 |
| 6,700,991 | B1 * | 3/2004 | Wu et al. | 382/100 |
| 7,457,431 | B2 * | 11/2008 | Shi et al. | 382/100 |
| 7,555,137 | B2 * | 6/2009 | Parisis et al. | 382/100 |
| 2005/0141747 | A1 * | 6/2005 | Shi et al. | 382/100 |
| 2006/0002584 | A1 * | 1/2006 | Lu | 382/100 |

FOREIGN PATENT DOCUMENTS
WO WO-02056264 7/2002

OTHER PUBLICATIONS

Zhicheng Ni, "Image data Hiding", PHD Thesis, Published in Jan. 2005, published by ProQuest information and learning company pp. 80.*
Jessica Fridrich et al., "Lossless Data Embedding with File Size Preservation" Department of Electrical and Computer Engineering, vol. 5306, No. 1, Jan. 19, 2004, pp. 354-365, XP002328294.
Brian Yang et al., "Reversible Image Watermarking by Histogram Modification for Integer DCT Coefficients," 2004 IEEE 6th Workshop on Multimedia Signal Processing, Italy, Sep. 29-Oct. 1, 2004, Piscataway, NJ, USA, IEEE, Sep. 29, 2004, pp. 143-146, XP010802106.

(Continued)

*Primary Examiner* — Brian Q Le
*Assistant Examiner* — Mekonen Bekele
(74) *Attorney, Agent, or Firm* — Connolly Bove Lodge & Hutz LLP

(57) ABSTRACT

Embodiments of the invention are directed toward reversible/invertible and lossless, image data hiding that can imperceptibly hide data into digital images and can reconstruct the original image without any distortion after the hidden data have been extracted in various digital image formats including, but not limited to Joint Photographic Experts Group (JPEG). In particular, embodiments of the invention provide a lossless data hiding technique for JPEG images based on histogram pairs. that embeds data into the JPEG quantized 8×8 block DCT coefficients and achieves good performance in terms of peak signal-to-noise ratio (PSNR) versus payload through manipulating histogram pairs with optimum threshold and optimum region of the JPEG DCT coefficients. Furthermore, the invented technology is expected to be able to apply to the I-frame of Motion Picture Experts Group (MPEG) video for various applications including annotation, authentication, and forensics.

40 Claims, 18 Drawing Sheets

High-level flow diagram of lossless data embedding and data extraction for JPEG images.

OTHER PUBLICATIONS

Zhicheng Ni, et al., "Reversible Data Hiding," IEEE Transactions on Circuits and Systems for Video Technology, vol. 16, No. 3, Mar. 2006, pp. 354-362, XP002484431.

Chen D-Y et al., "A Shift-Resisting Pulic Watermark System for Protecting Image Processing Software," IEEE Transactions on Consumer Electronics, IEEE Service Center, New York, NY, US, vol. 46, No. 3, Aug. 1, 2000, pp. 404-414, XP001142861.

International Search Report and Written Opinion issued in connection with related International Application No. PCT/US2008/054260 on Jul. 7, 2008.

J. Fridrich, et al., "Invertible Authentication Watermarking for JPEG Images," Proceedings of IEEE Information Technology and Computing Conference (ITCC), pp. 223-227, Las Vegas, Nevada, USA, Apr. 2001.

Zhicheng Ni, et al., "Reversible Data Hiding," IEEE International Symposium on Circuits and Systems (ISCAS03), pp. II-912-II-915, Bangkok, Thailand, May 2003.

Arno van Leest, et al., "Reversible Image Watermarking," Proceedings of IEEE International Conference on Image Processing (ICIP), II-731-II-734, vol. 3, Sep. 2003.

J. Fridrich, et al., "Lossless Data Embedding for All Image Formats," Proc. of SPIE, Electronic Imaging 2002, Security and Watermarking of Multimedia Contents IV, vol. 4675, San Jose, California, pp. 572-583, 2002.

J. Fridrich, et al., "Lossless Data Embedding with File Size Preservation," Proc. SPIE Electronic Imaging 2004, Security and Watermarking of Multimedia Contents, San Jose, California, Jan. 2004.

Chen et al., "A Shift-Resisting Public Watermark System for Protecting Image Processing Software", IEEE Transactions on Consumer Electronics, vol. 46, No. 3, pp. 404-414, Aug. 2000.

International Preliminary Report on Patentability and Written Opinion issued in related International Application No. PCT/US2008/054260 on Aug. 27, 2009.

* cited by examiner

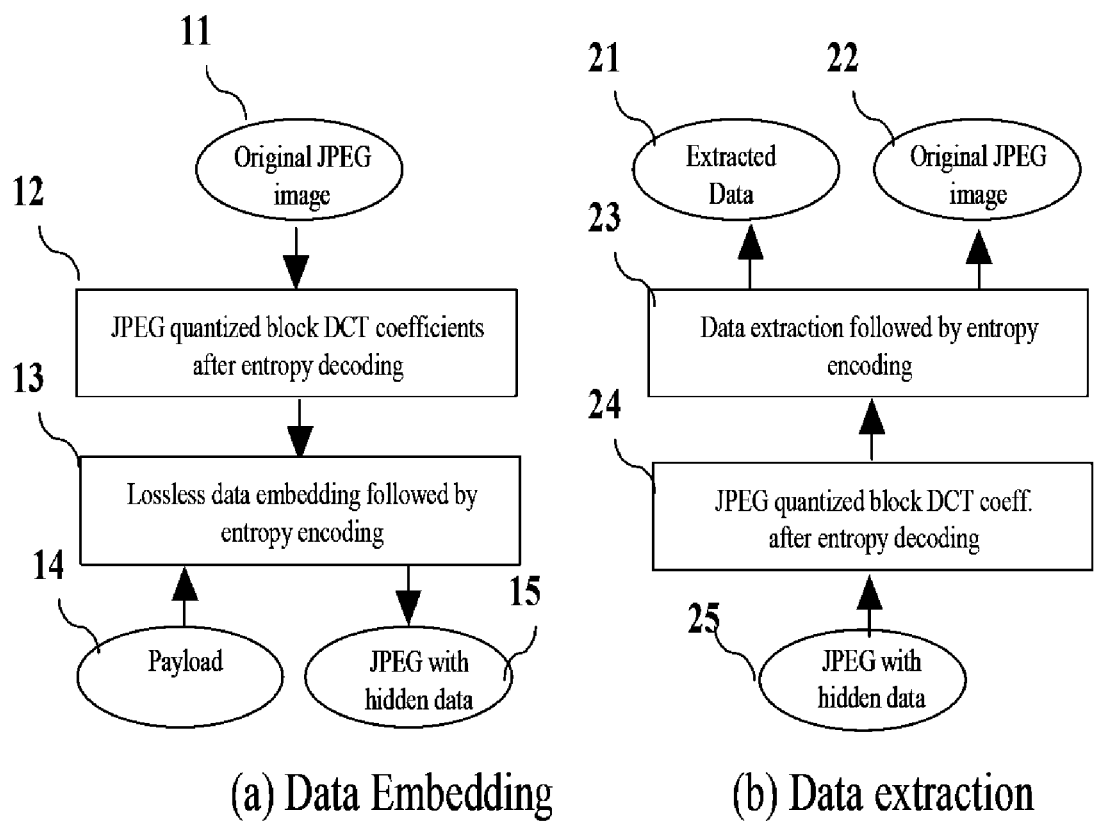
FIG. 1A. High-level flow diagram of lossless data embedding and data extraction for JPEG images.

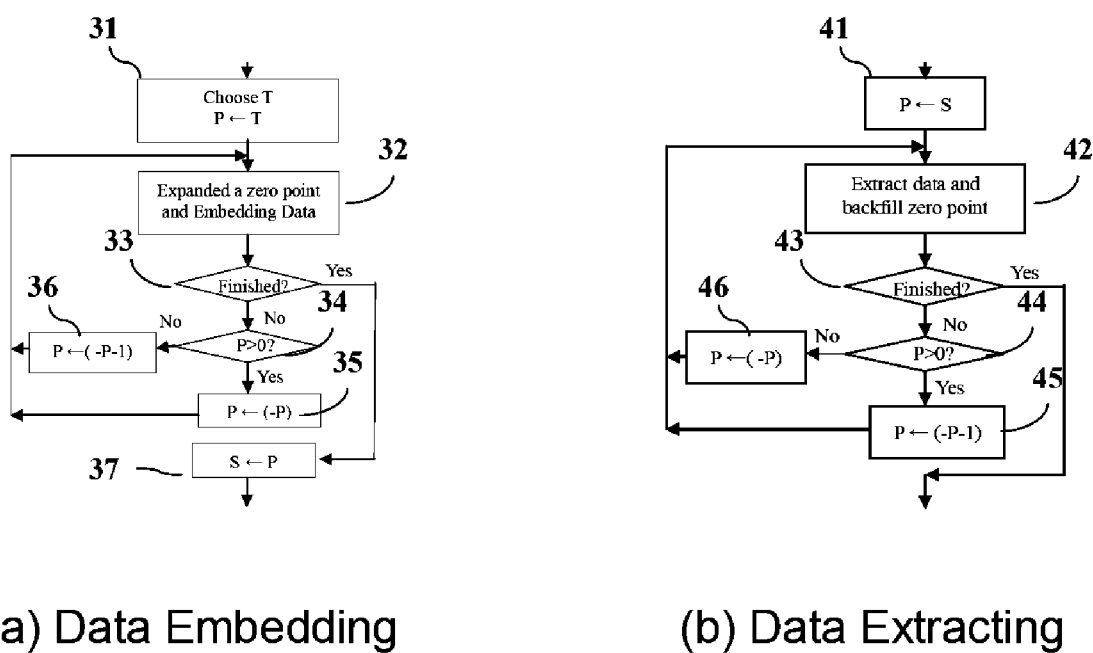
FIG. 1B An exemplary flow diagram of: (a) a method for lossless data embedding in JPEG images and (b) a method for data extraction from JPEG images.

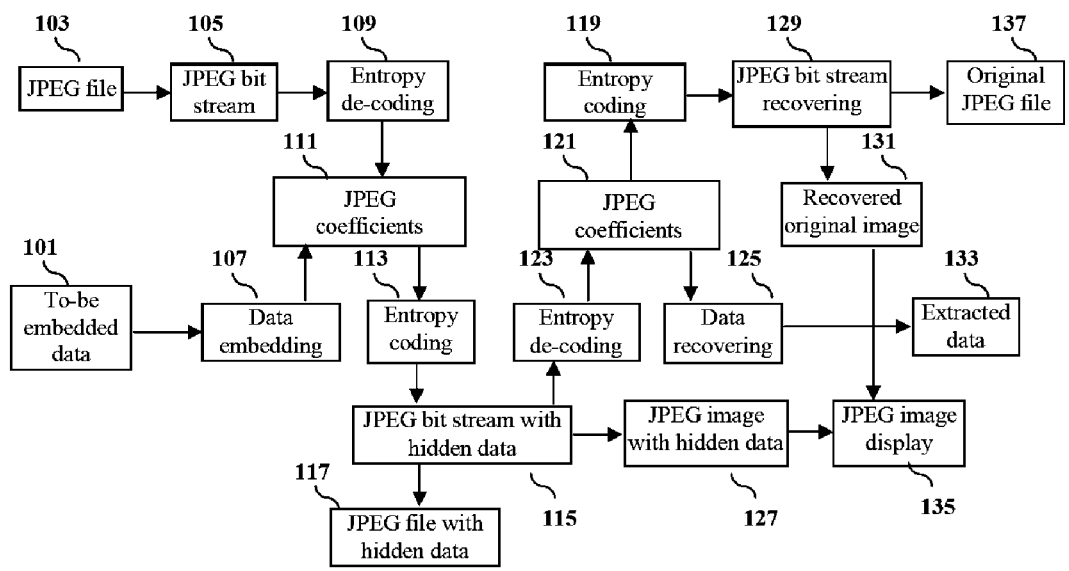
FIG. 1C. Detailed block diagram of lossless data embedding and data extraction for JPEG images.

| 0 | 2 | 0 |
|---|---|---|
| 0 | 3 | 2 |
| 2 | 0 | 3 |

| Histogram p(x) | 4 | 3 | 2 | 0 |
|---|---|---|---|---|
| Value x | 0 | 2 | 3 | 4 |

FIG. 2A Selection of threshold T=2

| 0 | 2 | 0 |
|---|---|---|
| 0 | 4 | 2 |
| 2 | 0 | 4 |

| Histogram p(x) | 4 | 3 | 0 | 2 |
|---|---|---|---|---|
| Value x | 0 | 2 | 3 | 4 |

FIG. 2B "Histogram pair" <h(2)=3,h(3)=0>

| 0 | 2 | 0 |
|---|---|---|
| 0 | 4 | 3 |
| 3 | 0 | 4 |

| Histogram p(x) | 4 | 1 | 2 | 2 |
|---|---|---|---|---|
| Value x | 0 | 2 | 3 | 4 |

FIG. 2C After embedding bit sequence D=[0,1,1]

FIG. 2A to FIG. 2C: Example of lossless data hiding using a histogram pair (note: left is image, right is histogram)

| Original histogram | Histogram after 1st embedding | Histogram after expansion | Histogram after 2nd embedding |
|---|---|---|---|
| [9,0,0,0] | [5,4,0,0] | [5,0,4,0] | [2,3,3,1] |

| a | a | a |
|---|---|---|
| a | a | a |
| a | a | a |

| a | b | a |
|---|---|---|
| a | b | a |
| b | b | a |

| a | c | a |
|---|---|---|
| a | c | a |
| c | c | a |

| b | c | a |
|---|---|---|
| b | d | b |
| c | c | a |

(a)      (b)      (c)      (d)

FIG. 2D Second example embedding bit sequence D=[ 0,1,0,0,1,0,1,1,0 ] in two loops.

| 0 | 4 | 0 | -4 | 1 |
|---|---|---|----|---|
| 0 | 2 | -2 | 3 | -1 |
| 4 | -3 | 0 | 2 | -3 |
| -1 | -2 | 0 | -1 | 0 |
| -2 | 1 | 2 | -1 | 1 |

(a)

| 0 | 6 | 0 | -5 | 1 |
|---|---|---|----|---|
| 0 | 2 | -2 | 4 | -1 |
| 6 | -3 | 0 | 2 | -3 |
| -1 | -2 | 0 | -1 | 0 |
| -2 | 1 | 2 | -1 | 1 |

(b)

| 0 | 6 | 0 | -5 | 1 |
|---|---|---|----|---|
| 0 | 2 | -2 | 5 | -1 |
| 6 | -4 | 0 | 2 | -3 |
| -1 | -2 | 0 | -1 | 0 |
| -2 | 1 | 3 | -1 | 1 |

(c)

FIG. 2E. Example: 5×5 image (a) original image, (b) image after 3 expanding, (c) image after 6-bit (D=[1 10 001]) embedding (what marked in red above is how the last 3 bits are embedded.)

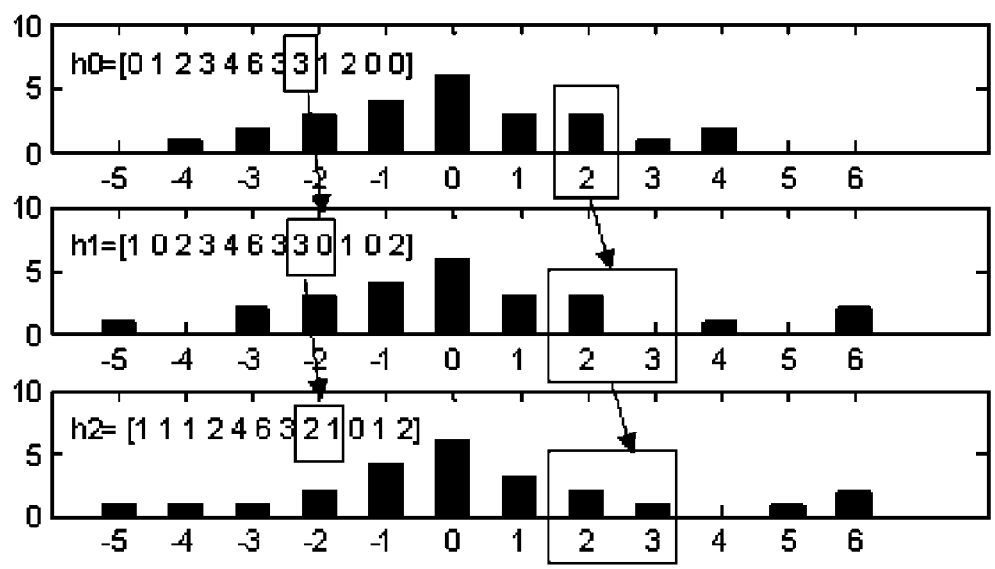
FIG. 2F Third example: Histogram pair data embedding example ( T=3 , S= +2 )
( 6 bit data D=[1 10 001] ) (What marked is how the last 3 bits are embedded.)

| 0 | 2 | -2 |
|---|---|----|
| -3 | 3 | 2 |
| 2 | 0 | 3 |

| Histogram p(x) | 0 | 1 | 1 | 2 | 3 | 2 | 0 |
|---|---|---|---|---|---|---|---|
| Value x | -4 | -3 | -2 | 0 | 2 | 3 | 4 |

FIG. 3A Original image, Threshold T=2, S= -2

| 0 | 2 | -2 |
|---|---|----|
| -4 | 4 | 2 |
| 2 | 0 | 4 |

| Histogram p(x) | 1 | 0 | 1 | 2 | 3 | 0 | 2 |
|---|---|---|---|---|---|---|---|
| Value x | -4 | -3 | -2 | 0 | 2 | 3 | 4 |

FIG. 3B "Histogram pair"<h(2)=3,h(3)=0> and <h(-3)=0,h(-2)=1 >

| 0 | 2 | -2 |
|---|---|----|
| -4 | 4 | 3 |
| 3 | 0 | 4 |

| Histogram p(x) | 1 | 0 | 1 | 2 | 1 | 2 | 2 |
|---|---|---|---|---|---|---|---|
| Value x | -4 | -3 | -2 | 0 | 2 | 3 | 4 |

FIG. 3C After embedding data [0,1,1,0]

FIG. 3A-3C. Example: Embedding bit sequence with two histogram pairs (left is image, right histogram)

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |
FIG. 4A R={16,36}
| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |
FIG. 4B R={4,36}
| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |
FIG. 4C R={16,49}
FIG. 4A – 4C. Selected DCT coefficients for data embedding
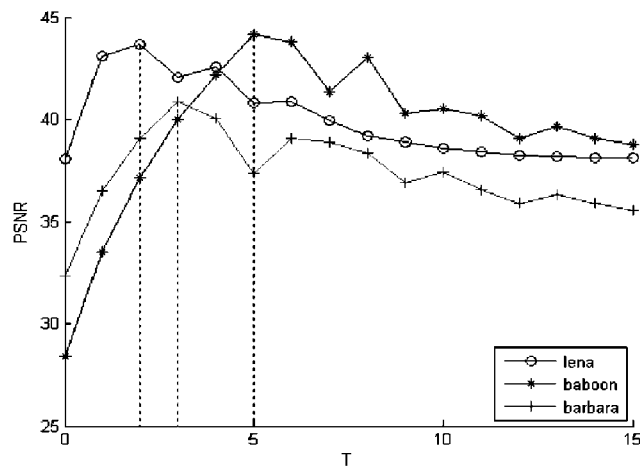
FIG. 5 Selecting DCT coefficients in zigzag scan from 16 to 36: {16,36}
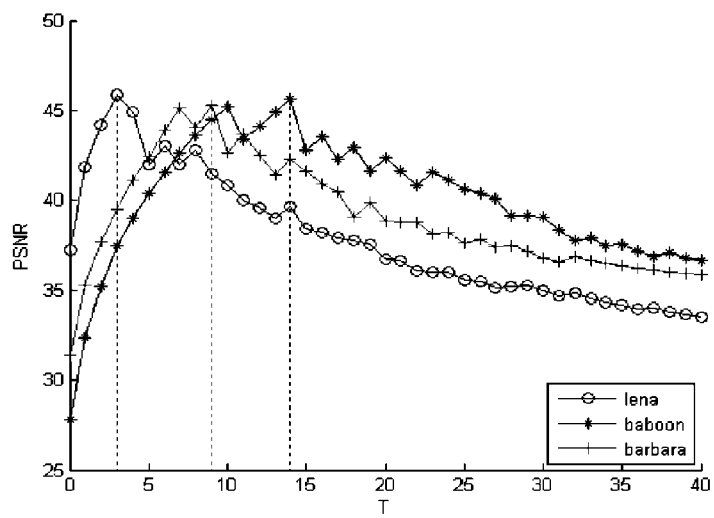
FIG. 6 Selecting DCT coefficients in zigzag scan from 4 to 36: {4,36}

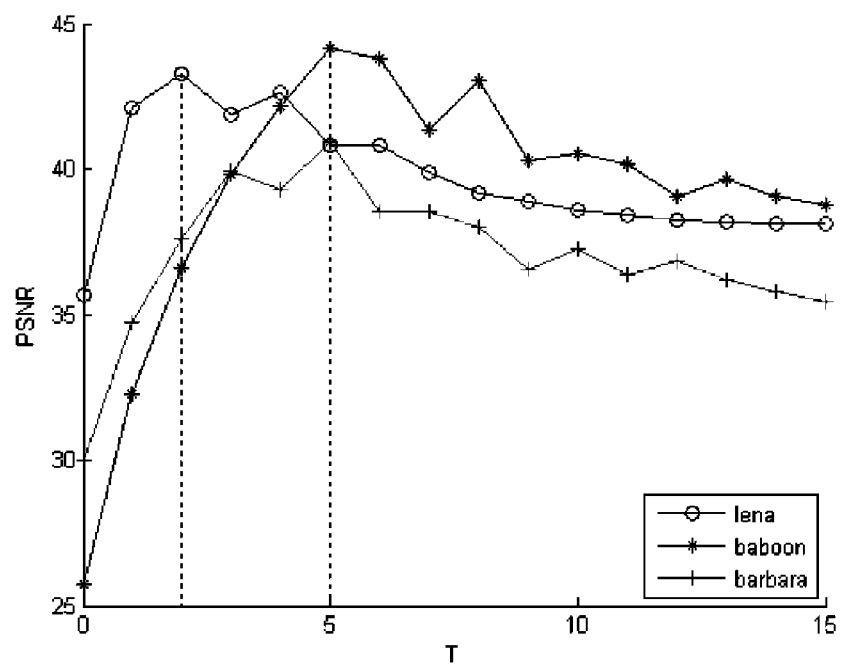
FIG. 7 Selecting DCT coefficients in zigzag scan from 16 to 49: {16,49}

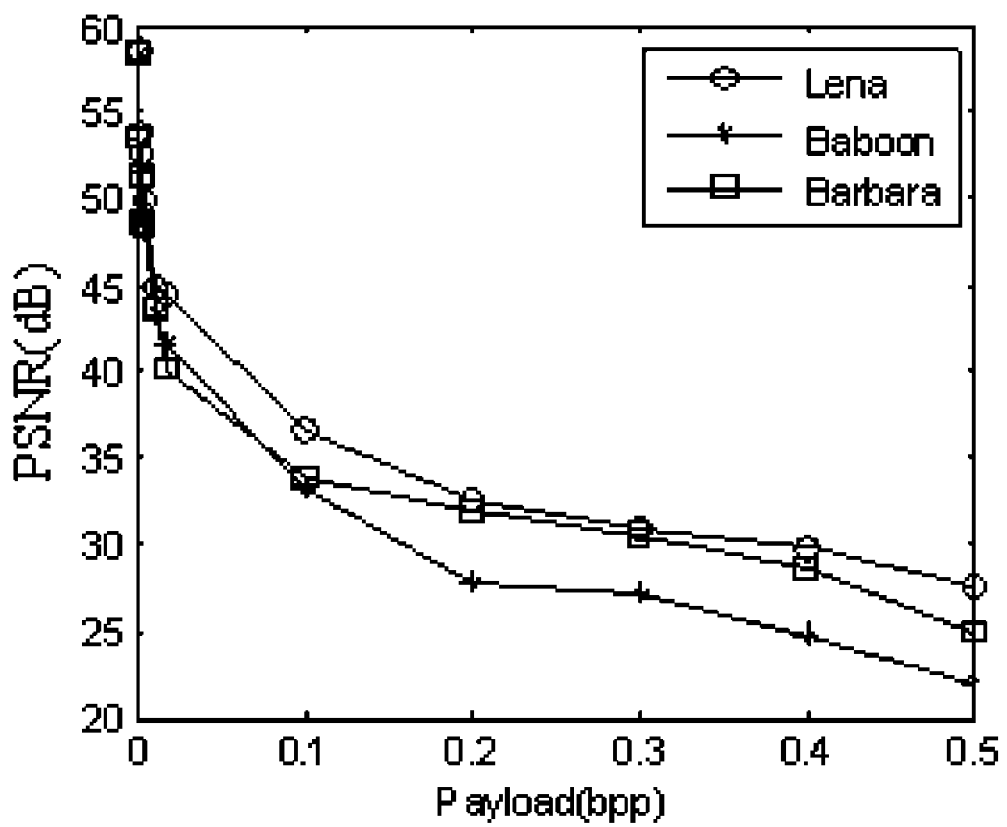
FIG. 8 Lossless data hiding in JPEG (regular form)

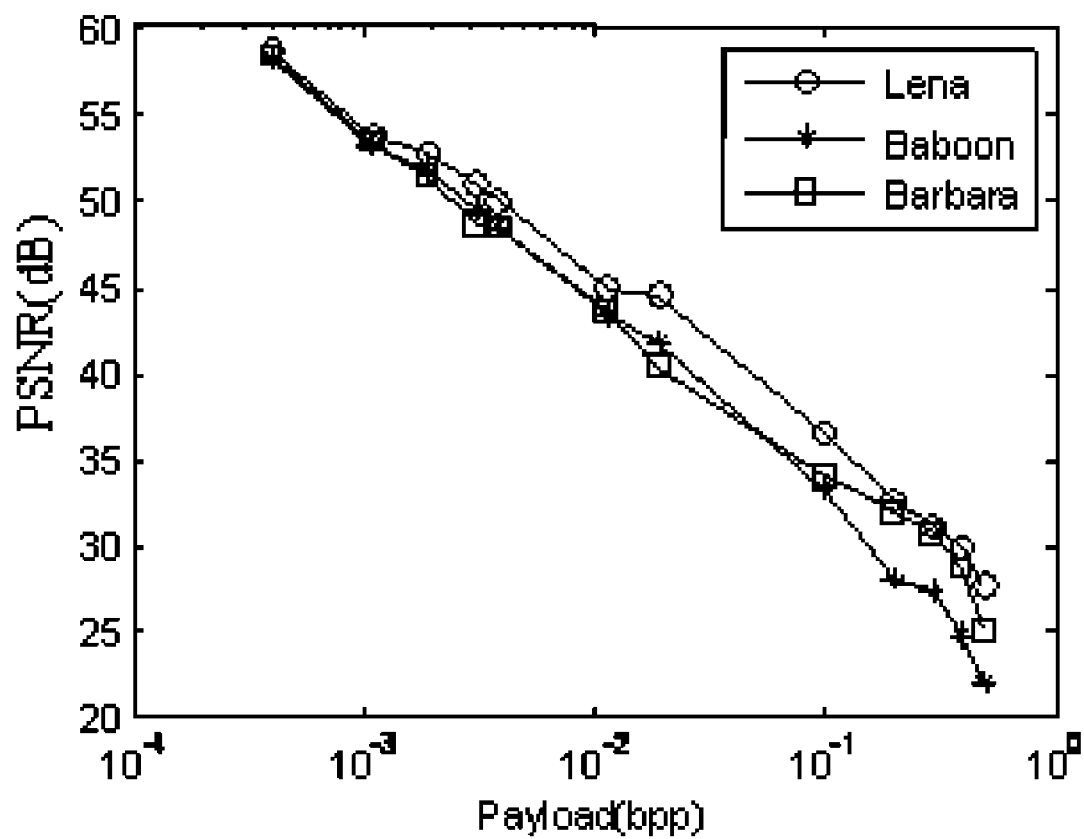
FIG. 9 Lossless data hiding in JPEG (log form)

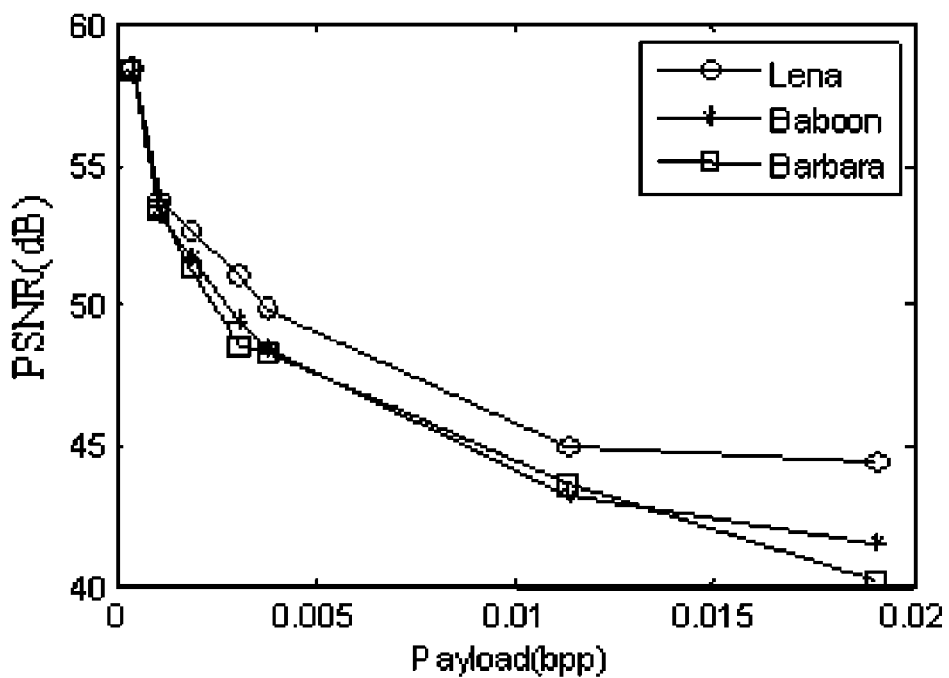
FIG. 10 Lossless data hiding in JPEG (small payload only)
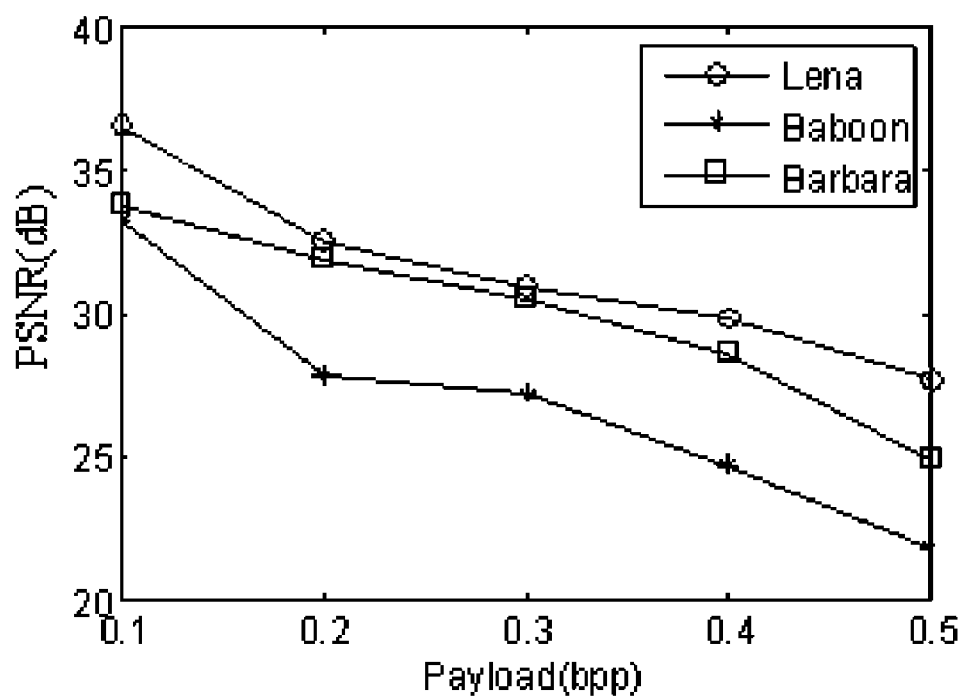
FIG. 11 Lossless data hiding in JPEG (large payload only)

FIG. 12. Original 512x512 Lena JPEG image with Q factor 80
FIG. 13. Lena image after embedding 100 bits (0.0004bpp) (PSNR: 58.47 dB)
FIG. 14. Lena image after embedding 5000 bits (0.0191bpp) (PSNR: 44.44 dB)

FIG. 15. Lena image after embedding 26,214 bits (0.1bpp) (PSNR: 36.54 dB)
FIG. 16. Lena image after embedding 131,072 bits (0.5bpp) (PSNR: 27.64 dB)
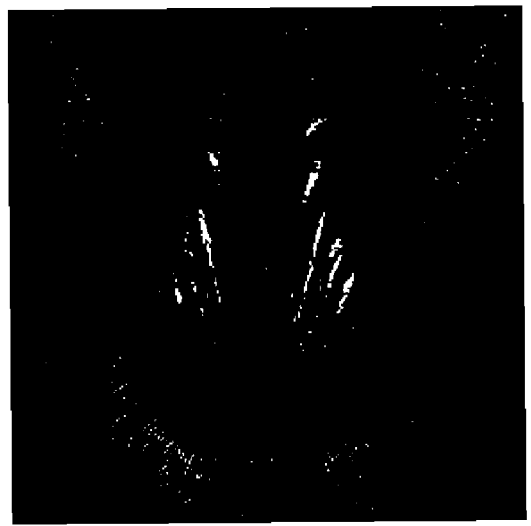
FIG. 17. Original 512x512 Baboon JPEG image with Q-factor 80

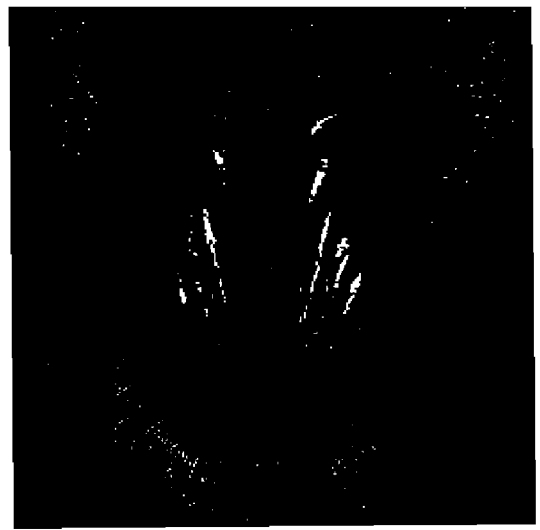
FIG. 18. Baboon image after embedding 100 bits (0.0004bpp) (PSNR: 58.34 dB)
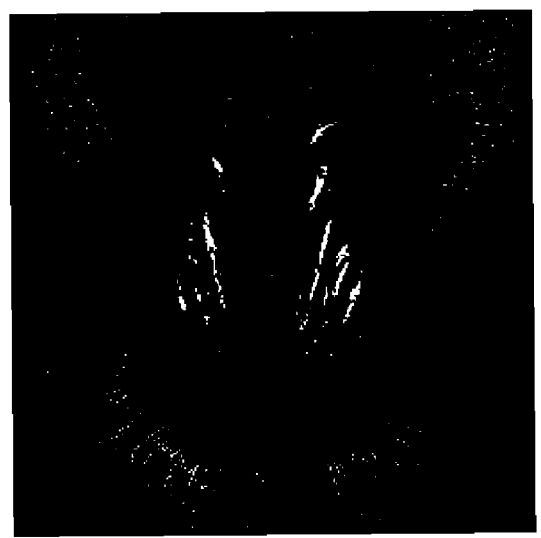
FIG. 19. Baboon image after embedding 5000 bits (0.0191bpp) (PSNR: 40.24 dB)
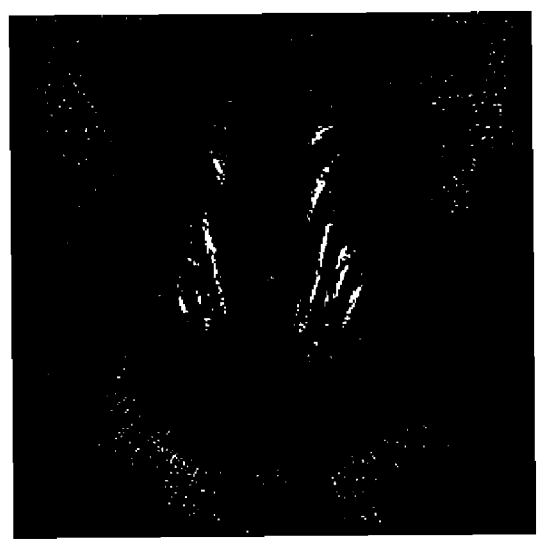
FIG. 20. Baboon image after embedding 26,214 bits (0.1bpp) (PSNR: 33.81 dB)

FIG. 21. Baboon image after embedding 131,072 bits (0.5bpp) (PSNR: 24.87 dB)
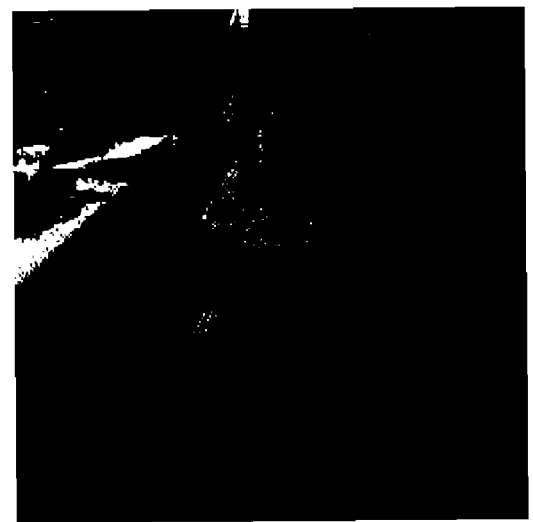
FIG. 22. Original 512x512 Barbara JPEG image with Q-factor 80
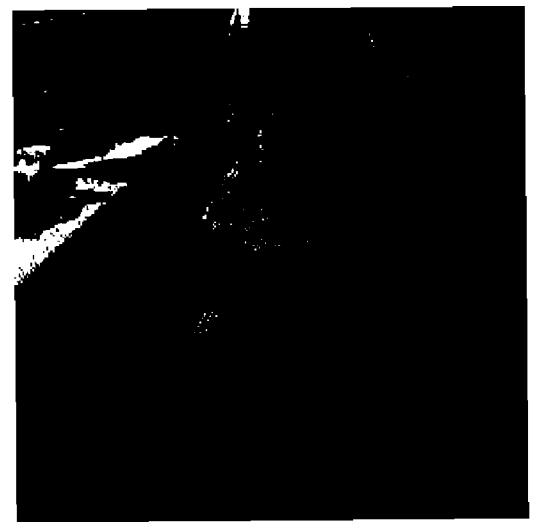
FIG. 23. Barbara image after embedding 100 bits (0.0004bpp) (PSNR: 58.21 dB)

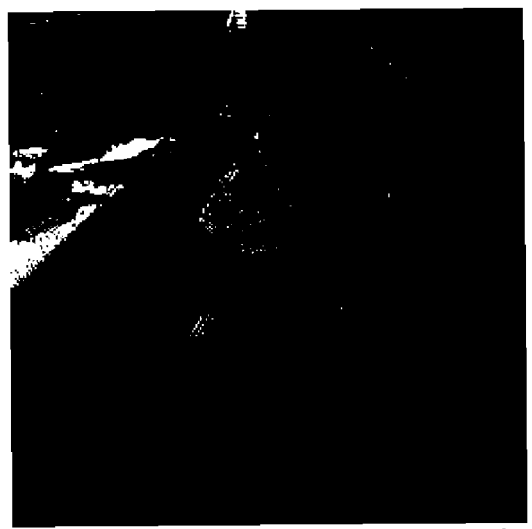
FIG. 24. Barbara image after embedding 5000 bits (0.0191bpp) (PSNR: 41.56 dB)
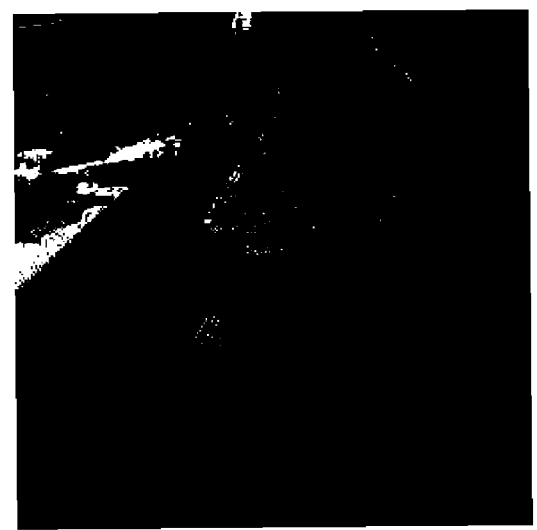
FIG. 25. Barbara image after embedding 26,214 bits (0.1bpp) (PSNR: 33.21 dB)
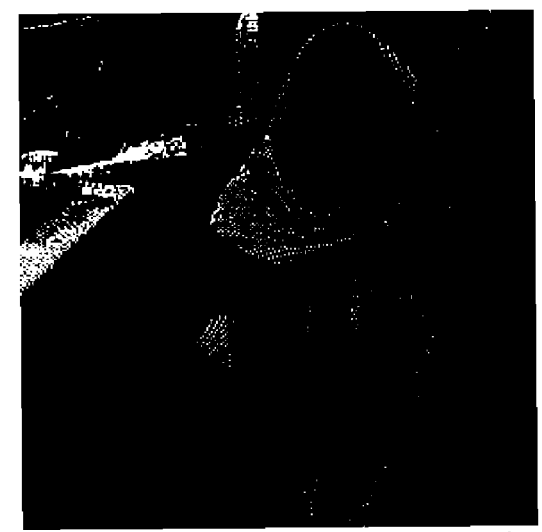
FIG. 26. Barbara image after embedding 131,072 bits (0.5bpp) (PSNR: 21.90 dB)

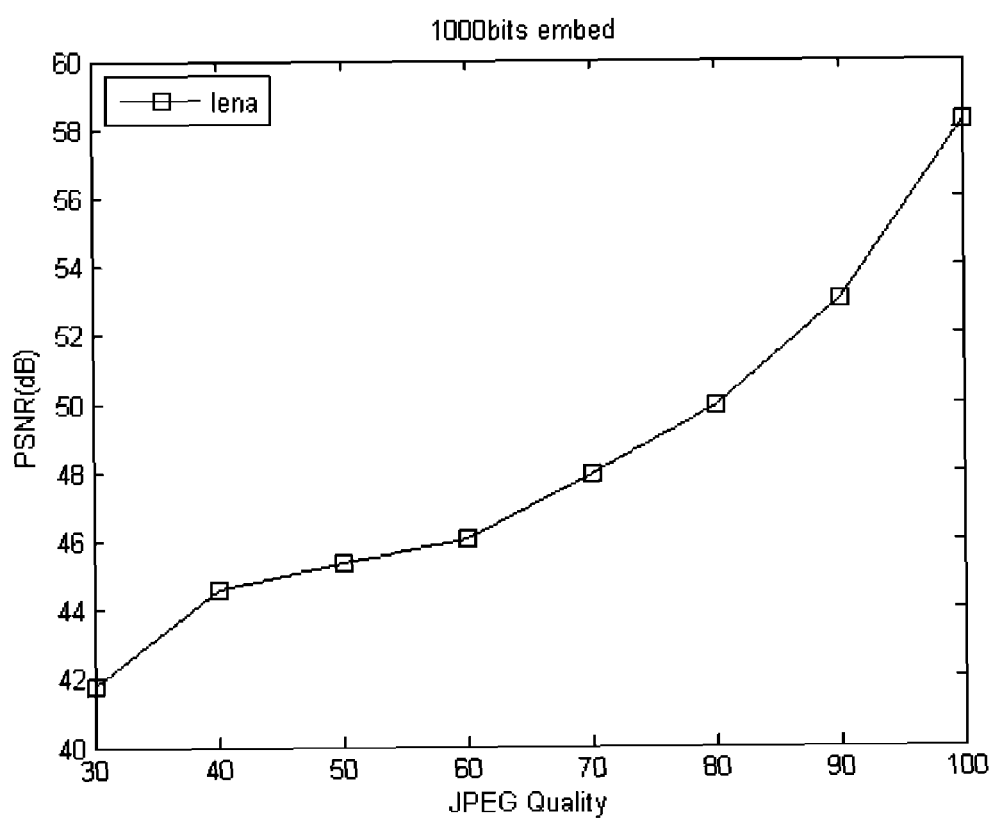
FIG. 27. PSNRs of images with hidden data versus various Q-factors when 1000 bits are embedded into 512x512 Lena JPEG image (payload is 0.0038 bpp and R = {4, 36})

APPARATUS AND METHOD FOR REVERSIBLE DATA HIDING FOR JPEG IMAGES

DESCRIPTION OF BACKGROUND ART

Reversible, also called invertible or lossless, image data hiding can imperceptibly hide data in digital images and can reconstruct the original image without any distortion after the hidden data has been extracted out. Among the various digital image formats, Joint Photographic Experts Group (JPEG) formats are by far used the most often nowadays. Hence, how to reversibly hide data in a JPEG image file is important and useful for many applications including authentication, secure data systems, and covert communications. For example, linking a group of data for some purpose to a cover image in a reversible way is particularly critical for medical images, high accuracy images, images used for legal purpose and other environments in which the original image is of great importance. Furthermore, the invented technology is expected to be able to apply to the I-frame of Motion Picture Experts Group (MPEG) video for various applications mentioned above.

Reversible data hiding by using the histogram shifting techniques has been reported in the literature. Reversible data hiding was first applied to the histogram of an image in the spatial domain in Z. Ni, Y. Q. Shi, N. Ansari, W. Su, "Reversible data hiding," IEEE International Symposium on Circuits and Systems (ISCAS03), Bangkok, Thailand, May 2003; and A. van Leest, M. van der Veen, and F. Bruekers, "Reversible image watermarking," Proceedings of IEEE International Conference on Image Processing (ICIP), II-731-4 vol. 3, September 2003. In addition, the technique was applied to the histogram of DCT domain and integer wavelet transform domain. In general, the histogram shifting technique has achieved dramatically improved performance in terms of embedding capacity versus visual quality of stego image measured by peak signal noise ratio (PSNR). However, none of the above-discussed lossless data hiding methods apply to JPEG images.

In fact, there are not many reversible data hiding techniques that have been developed for JPEG images to date. Some background art techniques are reported in J. Fridrich, M. Goljan and R. Du, "Invertible authentication watermarking for JPEG images," Proceedings of IEEE Information Technology and Computing Conference (ITCC), pp. 223-227, Las Vegas, Nev., USA, April 2001; J. Fridrich, M. Goljan, and R. Du, "Lossless data hiding for all image formats," *Proc. of SPIE, Electronic Imaging* 2002, *Security and Watermarking of Multimedia Contents IV*, vol. 4675, San Jose, Calif., pp. 572-583, 2002; and J. Fridrich, M. Goljan, Q. Chen, and V. Pathak, "Lossless data embedding with file size preservation," *Proc. SPIE Electronic Imaging* 2004, *Security and Watermarking of Multimedia Contents*, San Jose, Calif., January 2004.

In the first two background art references cited above, the least significant bit plane of some selected JPEG mode coefficients is losslessly compressed, thus leaving space for reversible data embedding. Consequently the payload is rather limited. In the third background art reference cited above, the run-length encoded alternating current (AC) coefficients are modified to losslessly embed data into JPEG images, aiming at keeping the size of JPEG file after lossless data hiding remaining unchanged. However, the payload is still rather limited (i.e., the highest payload in various experimental results reported in the third paper is 0.0176 bits per pixel (bpp)).

SUMMARY

Embodiments of the invention are directed at overcoming the foregoing and other difficulties encountered by the background arts. In particular, embodiments of the invention provide novel technique based on histogram pairs applied to some mid- and lower-frequency JPEG quantized 8×8 block discrete cosine transform (DCT) coefficients (hereinafter referred to as JPEG coefficients).

Embodiments of the invention provide methods using histogram pair techniques that are applied to the mid- and lower-frequency coefficients of 8×8 blocks DCT. Experimental results are presented below that demonstrate effectiveness of these methods. The data embedding capacity ranges from 0.0004, to 0.001, 0.1, up to 0.5 bits per pixel (bpp) for one-time data embedding, while the visual quality of images with hidden data measured by both subjective and objective PSNR remains high. The increase of size of image files due to data hiding is not noticeable, and the shape of histogram of the mid- and lower-frequency coefficients of DCT remains similar. It works for various JPEG Q-factors.

BRIEF DESCRIPTION OF THE DRAWINGS

FIG. 1A is an exemplary high-level flow diagram of: (a) a method for lossless data embedding and (b) a method for data extraction from JPEG images.

FIG. 1B is an exemplary flow diagram of: (a) a method for lossless data embedding in JPEG images and (b) a method for data extraction from JPEG images.

FIG. 1C is an exemplary detailed block diagram of methods for lossless data embedding and data extraction from JPEG image files.

FIG. 2A is an exemplary spatial representation of image data and a histogram of the image data, with a threshold T=2.

FIG. 2B is an exemplary spatial representation of image data and a histogram of the image data after histogram shifting to form a histogram pair.

FIG. 2C is an exemplary spatial representation of image data and a histogram of the image data after embedding bit sequence D=[0,1,1].

FIG. 2D is an exemplary bit sequence D=[0,1,0,0,1,0,1,1,0] embedded in two loops.

FIG. 2E is a 5×5 image data embedding example (to be embedded bit sequence is D=[1 10 001].

FIG. 2F is histograms associated with FIG. 2E.

FIG. 3A is another exemplary spatial representation of image data and its histogram of the image data, with a threshold T=2 and S=−2.

FIG. 3B is the image and histogram after histogram shifting to form two histogram pairs.

FIG. 3C is the image and histogram after the bit sequence D=[0 1 10] has been embedded.

FIG. 4A is an exemplary set of selected JPEG coefficients for data embedding {16, 36}.

FIG. 4B is another exemplary set of selected JPEG coefficients for data embedding {4, 36}.

FIG. 4C is yet another exemplary set of selected JPEG coefficients for data embedding {16, 49}.

FIG. 5 is an exemplary plot of selected JPEG coefficients in a zigzag scan from 16 to 36: {16, 36} for various images.

FIG. 6 is an exemplary plot of selected JPEG coefficients in a zigzag scan from 4 to 36: {4, 36} for various images.

FIG. 7 is an exemplary plot of JPEG coefficients in a zigzag scan from 16 to 49: {16, 49} for various images.

FIG. 8 is an exemplary plot of PSNR versus achieved by the lossless data hiding method of embodiments of the invention with three commonly used JPEG images in regular form.

FIG. 9 is an exemplary plot of PSNR versus payload achieved by the lossless data hiding method of embodiments of the invention with three commonly used JPEG images in log (log (x)) form.

FIG. 10 is an exemplary plot of PSNR versus payload achieved by the lossless data hiding method of embodiments of the invention with three commonly used JPEG images (with small payload).

FIG. 11 is an exemplary plot of PSNR versus payload achieved by the lossless data hiding method of embodiments of the invention with three commonly used JPEG images (with large payload).

FIG. 12 is an original 512×512 "Lena" JPEG image with Q-factor 80.

FIG. 13 is the "Lena" JPEG image after embedding 100 bits (0.0004 bits per pixel (bpp)).

FIG. 14 is the "Lena" JPEG image after embedding 5000 bits (0.0191 bpp).

FIG. 15 is the "Lena" JPEG image after embedding 26,214 bits (0.1 bpp).

FIG. 16 is the "Lena" JPEG image after embedding 131,072 bits (0.5 bpp).

FIG. 17 is an original 512×512 "Baboon" JPEG image with Q-factor 80.

FIG. 18 is the "Baboon" JPEG image after embedding 100 bits (0.0004 bpp).

FIG. 19 is the "Baboon" JPEG image after embedding 5000 bits (0.00191 bpp).

FIG. 20 is the "Baboon" JPEG image after embedding 26,214 bits (0.1 bpp).

FIG. 21 is the "Baboon" JPEG image after embedding 131,072 bits (0.5 bpp).

FIG. 22 is an original 512×512 "Barbara" JPEG image with Q-factor 80.

FIG. 23 is the "Barbara" JPEG image after embedding 100 bits (0.0004 bpp).

FIG. 24 is the "Barbara" JPEG image after embedding 5000 bits (0.00191 bpp).

FIG. 25 is the "Barbara" JPEG image after embedding 26,214 bits (0.1 bpp).

FIG. 26 is the "Barbara" JPEG image after embedding 131,072 bits (0.5 bpp).

FIG. 27. PSNR with hidden data versus Q-factors with 1000 bits embedded into 512×512 Lena image with various Q-factors (JPEG coefficient region {4, 36}).

DETAILED DESCRIPTION

Embodiments of the invention relate to data hiding. Data hiding techniques can be used for purpose such as copyright protection, authentication, annotation, and steganography. Reversible data hiding's unique/main characteristics are its reversibility or losslessness. Reversible data hiding is mainly used for medical images (for legal consideration) and military, remote sensing, and high-energy physics images (for high accuracy). There is a need in the art for lossless data hiding methods that can be applied to JPEG images, allows for a sizable payload and maintains the size of the JPEG file after lossless data hiding.

The principles of histogram pair based lossless data embedding are used in embodiments of the invention. A histogram, $h(x)$, is the number of occurrences (i.e., the frequency) of feature x within a set of samples X. In embodiments of the invention, the samples X are some selected JPEG quantized 8×8 DCT coefficients where the feature x is the JPEG coefficients' value. The x is either positive, or negative integer, or zero, such as $x \in \{-2, -1, 0, 1, 2, 3\}$. A histogram pair is defined as a part of the histogram, denoted by $h=[m, n]$, where m and n are, respectively, the frequencies of two immediately neighboring feature values $x \in \{a, b\}$ with $a<b$ i.e., $b=a+1$, and one of the two frequencies (m and n) is 0.

Histogram pairs can be formulated via a process called histogram expansion. For example, via expanding, the histogram pair $h=[\underline{m},0]$ can be produced (note: the underline is used to mark the histogram pair). The feature value whose frequency (i.e., h value) is not 0 is called the feature's original position. The feature value whose h value is 0 is called the feature's expansion position. For embodiments of the invention, it is defined that when the feature value x is greater than or equal to 0, the histogram pair is of the format $h=[\underline{m},0]$, which means $h(a)=m$ and $h(b)=0$, when the feature value x is less than 0, the histogram pair is of $h=[0,\underline{n}]$, which means $h(a)=0$ and $h(b)=n$.

After the histogram pair is produced, lossless data embedding is possible. Data embedding rule may be as follows:
  a. If the to-be-embedded bit is 0, the feature's original position is used; and
  b. if the to-be-embedded bit is 1, the feature's expansion position is used.

Alternative embodiments of the invention may be implemented with the elements of the above rule reversed. Examples of embodiments of the invention with the above rules are discussed in the following paragraphs. It is observed that after data embedding the histogram becomes more flat. When the histogram is completely flat, it is impossible to further embed data.

FIG. 1A is an exemplary high-level flow diagram for a (a) method for lossless data embedding and (b) a method of data extraction from JPEG images. In the method for data embedding, as shown in part (a) of FIG. 1A, Step 11 is inputting an original JPEG image. Step 12 of the method involves entropy decoding the original JPEG image and determining JPEG quantized block Discrete Cosine Transform (DCT) coefficients from the entropy decoded original JPEG image. In Step 13, a payload for embedding in the entropy decoded JPEG image, which is provided in Step 14, is supplied; lossless data embedding of the payload in the entropy decoded original JPEG image occurs; and entropy encoding the data embedded entropy decoded original JPEG image. At Step 15, a JPEG image with hidden data is the output of the method for data embedding.

In the method for data extracting, as shown in part (b) of FIG. 1A, Step 25 is inputting a JPEG image with hidden data. Entropy decoding the JPEG image with hidden data and determining JPEG quantized block Discrete Cosine Transform (DCT) coefficients from the entropy decoded JPEG image with hidden data are performed in Step 24. Step 23 is data extracting a payload from the entropy decoded JPEG image with hidden data and entropy encoding the payload and an original JPEG image without hidden data. The original JPEG image without hidden data and a payload of extracted data is outputted in Step 22 and Step 21, respectively.

FIG. 1B is an exemplary flow diagram of: (a) a method for lossless data embedding in JPEG images and (b) a method for data extraction from JPEG images. In the method for lossless data embedding of in part (a) of FIG. 1B, assume the length of the to-be-embedded data is L. P is a value assumed by JPEG coefficients, which is used for data embedding. We consider the selected P=T as the "starting point" for data embedding, and P=S as the stopping point. Payload can be measured either in number of bits, L, or bits per pixel (bpp). The term bpp is more general, since for the same L, if the image size is different, the bpp will be difference. For, say, a 512×512 images, 0.1 bpp means 26,214 bits (see the big tables later in the report), if consider a 256×256 image, 0.1 bpp means L=0.25×26,214 bits. For all of three commonly used 512×512 images, when we embed 0.1 bpp payload, the PSNR is 36 dB, meaning acceptable visual quality. Hence, roughly speaking, embedding 0.1 bpp up to 0.2 bpp has no problem with our proposed method.

In Step 31, a threshold (T) is set so T>0 and set the P←T in order to let the number of the mid- and low-frequency JPEG coefficients within the range [−T, T] be greater than L. For Step 32, in the JPEG coefficient histogram, move the portion of histogram with the coefficient values greater than P to the right-hand side by one unit to make the histogram at P+1 equal to zero (i.e., call P+1 as a zero-point). Also in Step 32, according to whether the to-be-embedded bit is 0 or 1, embed data into P or P+1, respectively. Step 33 determines whether method for data embedding is finished. If the answer at Step 33 is "NO" (i.e., some of the to-be-embedded bits have not been embedded at this point) and the answer to P>0 is "NO" in Step 34, let P←(−P−1) in Step 36 and move the histogram (i.e., less than P) to the left-hand side by one unit to leave a zero-point at the value (P−1). Also in Step 36, according to whether the to-be-embedded bit is 0 or 1, embeds data into P or (P−1), respectively. Then continue the method for embedding by returning to Step 32 and embedding the remaining to-be-embedded data.

Alternatively, if the answer at Step 33 is "NO" (i.e., some of the to-be-embedded bits have not been embedded at this point) and the answer to P>0 is "YES" in Step 34, let P←(−P) in Step 35 and move the histogram (i.e., less than P) to the left-hand side by one unit to leave a zero-point at the value (P−1). Also in Step 35, according to whether the to-be-embedded bit is 0 or 1, embeds data into P or (P−1), respectively. Then continue the method for embedding by returning to Step 32 and embedding the remaining to-be-embedded data.

Alternatively, if the answer at Step 33 is "YES" (i.e., all the data has been embedded), then stop the method for embedding and record the value P as the stop value S (i.e., let S←P) in Step 37.

In the method for data extraction in part (b) of FIG. 1B, assume the stop position S of data embedding is positive. In Step 41 of part (b) of FIG. 1B, set P←S. In Step 42, decode with the stopping value P and the value (P+1) and extract all the data until P+1 becomes a zero-point. In addition in Step 42, move all the DCT coefficients histogram (greater than P+1) towards the left-hand side by one unit to eliminate the zero-point. If the amount of extracted data is less than C, set P←(−P−1). Continue to extract data until (P−1) becomes a zero-point. Then move the histogram (less than P−1) to the right-hand side by one unit to eliminate the zero-pint.

Step 43 determines whether method for data extraction is finished (i.e., is the amount of extracted data less than C). If the answer at Step 43 is "NO" (i.e., some of the to-be-extracted bits have not been extracted at this point) and the answer to P>0 is "YES" in Step 44, let P←(−P−1) in Step 45 and move the histogram (i.e., less than P−1) to the right-hand side by one unit to eliminate a zero-point). Then continue the method for extracting by returning to Step 42 and extracting the remaining to-be-extracted data.

Alternatively, if the answer at Step 43 is "NO" (i.e., some of the to-be-extracted bits have not been extracted at this point) and the answer to P>0 is "No" in Step 44, let P←(−P) in Step 46 and move the histogram (i.e., less than P−1) to the right-hand side by one unit to eliminate a zero-point). Then continue the method for extracting by returning to Step 42 and extracting the remaining to-be-extracted data.

Alternatively, if the answer at Step 43 is "YES" (i.e., all the data has been extracted), then stop the method for extracting. Histogram shifting makes histogram more flat, thus embedding data into JPEG image file. Consider the horizontal axis of a histogram as representing the value of a set of selected mid- and lower frequency coefficients of an 8×8 block DCT that are integer-valued after JPEG quantization.

Consider one selected pair of points in a histogram. Denote the length of to-be-embedded bit stream by L, a selected point in the horizontal axis by T, and its histogram value by h(T). If L≦h(T), this single T point is enough for data embedding. The whole histogram can be divided into three parts: (1) a central part; (2) a to-be-embedded part; and (3) an end part. The central part is the histogram whose value is less than T and kept intact during data embedding. The to-be-embedded part is the histogram pair whose values will change according to the to-be-embedded bits. The end part is the histogram whose value is greater than T and will be shifted outwards before data embedding.

FIG. 1C is an exemplary detailed block diagram of a method for lossless data hiding and a method for data extraction from JPEG images. In FIG. 1C, data to be embedded 101 and a JPEG file 103 are configured to provide to a data embedding function 105 and a JPEG bits stream function 107, respectively. The JPEG bit stream function 107 is configured to provide inputs to a first entropy decoding function 109. The data embedding function 105 and entropy decoding function are configured to provide inputs to a JPEG coefficient function 111. The JPEG coefficient function 111 is configured to provide inputs to an entropy coding function 113. The entropy coding function 113 is configured to provide inputs to a JPEG bit stream with hidden data function 115. The JPEG bit stream with hidden data function 115 is configured to provide inputs to a JPEG file with hidden data 117, a JPEG image with hidden data 127 and a second entropy decoding function 123. The second entropy decoding function is configured to provide inputs to a second JPEG coefficient function 121. The second JPEG coefficient function 121 is configured to provide inputs to a data recovering function 125 and a second entropy coding function 119. The data recovering function 125 is configured to provide extracted data 133. The second entropy coding function is configured to provide inputs to a JPEG bit stream recovering function 129. The JPEG bit stream recovering function 129 is configured to provide inputs to a recovered original image 131 and an original JPEG file 137. The JPEG image with hidden data 127 and the recovered original image 131 are configured to provide inputs to a JPEG image display 135.

FIG. 1C is an exemplary flow diagram of: (a) a method for lossless data embedding in JPEG images and (b) a method for data extraction from JPEG images. In the method for lossless data embedding of in part (a) of FIG. 1C, assume the length of the to-be-embedded data is L. P is a value assumed by JPEG coefficients, which is used for data embedding. We can consider the selected P=T as the "starting point" for data embedding, and P=S as the stopping point. Payload can be measured either in number of bits, L, or bits per pixel (bpp). The term bpp is more general, since for the same L, if the image size is different, the bpp will be difference. For, say, a 512×512 images, 0.1 bpp means 26,214 bits (see the big tables later in the report), if consider a 256×256 image, 0.1 bpp means L=0.25×26,214 bits. For all of three commonly used 512×512 images, when we embed 0.1 bpp payload, the PSNR is 36 dB, meaning acceptable visual quality. Hence, roughly speaking, embedding 0.1 bpp up to 0.2 bpp has no problem with our proposed method.

In Step 1, a threshold (T) is set so T>0 and set the P←T in order to let the number of the mid- and low-frequency JPEG coefficients within the range [−T,T] be greater than L. For Step 2, in the JPEG coefficient histogram, move the portion of histogram with the coefficient values greater than P to the right-hand side by one unit to make the histogram at P+1 equal to zero (i.e., call P+1 as a zero-point). Also in Step 2, according to whether the to-be-embedded bit is 0 or 1, embed data into P or P+1, respectively. Step 3 determines whether method for data embedding is finished. If the answer at Step 3 is "NO" (i.e., some of the to-be-embedded bits have not been embedded at this point) and the answer to P>0 is "NO" in Step 4, let P←(−P−1) in Step 6 and move the histogram (i.e., less than P) to the left-hand side by one unit to leave a zero-point at the value (P−1). Also in Step 6, according to whether the to-be-embedded bit is 0 or 1, embeds data into P or (P−1), respectively. Then continue the method for embedding by returning to Step 2 and embedding the remaining to-be-embedded data.

Alternatively, if the answer at Step 3 is "NO" (i.e., some of the to-be-embedded bits have not been embedded at this point) and the answer to P>0 is "YES" in Step 4, let P←(−P) in Step 5 and move the histogram (i.e., less than P) to the left-hand side by one unit to leave a zero-point at the value (P−1). Also in Step 5, according to whether the to-be-embedded bit is 0 or 1, embeds data into P or (P−1), respectively. Then continue the method for embedding by returning to Step 2 and embedding the remaining to-be-embedded data.

Alternatively, if the answer at Step 3 is "YES" (i.e., all the data has been embedded), then stop the method for embedding and record the value P as the stop value S (i.e., let S←P) in Step 7.

In the method for data extraction in part (b) of FIG. 1C, assume the stop position S of data embedding is positive. In Step 11 of part (b) of FIG. 1C, set P←S. In Step 12, decode with the stopping value P and the value (P+1) and extract all the data until P+1 becomes a zero-point. In addition in Step 12, move all the DCT coefficients histogram (greater than P+1) towards the left-hand side by one unit to eliminate the zero-point. If the amount of extracted data is less than C, set P←(−P−1). Continue to extract data until (P−1) becomes a zero-point. Then move the histogram (less than P−1) to the right-hand side by one unit to eliminate the zero-pint.

Step 13 determines whether method for data extraction is finished (i.e., is the amount of extracted data less than C). If the answer at Step 13 is "NO" (i.e., some of the to-be-extracted bits have not been extracted at this point) and the answer to P>0 is "YES" in Step 14, let P←(−P−1) in Step 15 and move the histogram (i.e., less than P−1) to the right-hand side by one unit to eliminate a zero-point). Then continue the method for extracting by returning to Step 12 and extracting the remaining to-be-extracted data.

Alternatively, if the answer at Step 23 is "NO" (i.e., some of the to-be-extracted bits have not been extracted at this point) and the answer to P>0 is "No" in Step 14, let P←(−P) in Step 16 and move the histogram (i.e., less than P−1) to the right-hand side by one unit to eliminate a zero-point). Then continue the method for extracting by returning to Step 12 and extracting the remaining to-be-extracted data.

Alternatively, if the answer at Step 3 is "YES" (i.e., all the data has been extracted), then stop the method for extracting. Histogram shifting makes histogram more flat, thus embedding data into JPEG image file. Consider the horizontal axis of a histogram as representing the value of a set of selected mid- and lower frequency coefficients of an 8×8 block DCT that are integer-valued after JPEG quantization.

Consider one selected point in a histogram with its feature, x, value (in the horizontal axis) equal to T, and its histogram value equal to h(T). Denote the length of to-be-embedded bit stream by L. If L≦h(T), this single T point is enough for data embedding. The whole histogram can be divided into three parts: (1) a central part; (2) a to-be-embedded part; and (3) an end part. The central part is the histogram whose value is less than T and kept intact during data embedding. The to-be-embedded part is the histogram pair whose values will change according to the to-be-embedded bits. The end part is the histogram whose value is greater than T and will be shifted outwards before data embedding.

FIG. 2A to FIG. 2C is a simple example to illustrate the histogram pair. Assume a simple image is the left part of FIG. 2A. The right part of FIG. 2A is its histogram. We assume the threshold T is value 2. Then the central part is value 0, which is intact in data embedding. The end part is the value 3, which is going to shift to right side by one unit before data embedding in order to leave histogram value at x=3 empty for data embedding. After the edge histogram shifting, the new image and its corresponding histogram are shown in FIG. 2B. Now the h(2) and h(3) becomes a histogram pair.

In one histogram pair T and T+1, the rule for data embedding is: if the to-be-embedded bit is 0, the value is kept T. If the to-be-embedded bit is 1, the value becomes T+1. Now assume the to-be-embedded bits are [0,1,1], we scan the image from left to right and from top to down. Once we meet pixel value T, we check the to-be-embedded bit and change its value according to the to-be-embedded bit. In this way, after data embedding, the embedded image and its histogram are presented in FIG. 2C.

Consider the case of multiple selected pairs of points in histogram. If the length of to-be-embedded bit stream L>h(T), then only one T (or one histogram pair) is not enough for data embedding. Then we need multiple T (or multiple histogram pairs) to embed data. These Ts are positive and negative in turn, such as [T,−T,T−1,−(T−1),T−2,−(T−2), . . . , S]. Same as the case of single T, the histogram is also divided into three parts: (1) a central part; (2) a to-be-embedded; and (3) an edge part. As discussed above, the central part is the histogram whose value is less than T and kept intact while data embedding. The to-be-embedded part is the histogram pair whose value will change according to the to-be-embedded bits. The end part is the histogram whose value is greater than T and will be shifted to outer end before data embedding. After histogram shifting, the histogram pairs are [<h(T),h(T+1)=0>, <h(-T-1)=0,h(-T)>, <h(T-1),h(T)=0>, <h(-T)=0,h(-(T-1))>, <h(T-2),h(T-1)=0>, <h(-(T-1)=0,h(-(T-2))>, . . . ]. When the embedding process stops, if the S is negative, then the histogram pair is <h(S-1)=0,h(S)>. If the S is positive, then the histogram pair is <h(S),h(S+1)=0>.

As an example of reversible data embedding using single histogram pair, assume samples are X=[a,a,a,a], i.e., the number of samples is M=4, feature values x∈{a,b} are greater than 0. There is one histogram pair h=[4,0]. Suppose that the to-be-embedded binary sequence is D=[1,0,0,1] whose length L is equal to 4, i.e., L=4.

During data embedding, we scan the sequence X=[a,a,a,a] in a certain sequencing, say, from left to right. When we meet the first a, since we want to embed bit 1, we change a to its expansion position, b. For the next two to-be-embedded bits, since they are bit 0, we keep a in its original position, i.e., we do not change a. For the last to-be-embedded bit 1, we change a to b. Therefore, after the four-bit embedding, we have X=[b,a,a,b], and the histogram is now h=[2,2]. Embedding capacity is C=L=4. Data extraction, or histogram pair recovery, is the reverse process of the above mentioned data embedding. After extracting the data D=[1,0,0,1], the histogram pair becomes [4,0] and we recover X=[a,a,a,a] losslessly. Note that after data embedding, histogram is changed from h=[4,0] to h=[2,2], histogram is completely flat and hence we cannot embed data any more.

As another example of reversible data embedding we examine the method when using two loops. Given a 3×3 image, the feature values are x∈{a,b,c,d}, where features are all greater than 0. According to the scan order, say, from left to right and from top to bottom, the samples X become X=[a,a,a,a,a,a,a,a,a], the total number of samples M=9, histogram is h=[9,0,0,0], as shown in FIG. 2D(a). The histogram pair is h=[9,0]. The to-be-embedded bit sequence is D=[0,1,0,0,1,0,1,1,0] and L=9.

In the first data embedding loop "Loop 1," since the first to-be-embedded bit is 0, use the original feature position a (meaning no change for the first a), the second bit is 1, use the expansion position (meaning change a to b). In this way, we totally embed 9 bits, after data embedding, the samples become X=[a,b,a,a,b,a,b,b,a], refer to FIG. 2D(b). After the first embedding loop, the histogram h=[9,0,0,0] becomes h=[5,4,0,0]. The payload is $C_1$=L=9 bits.

For the second data embedding loop "Loop 2," expanding the first: the histogram pair h=[4,0] is shifted towards the right-hand side by one position, thus producing the histogram with two histogram pairs h=[5,0,4,0] and the samples become X=[a,c,a,a,c,a,c,c,a], refer to FIG. 2D(c). The second embedding loop will separately use the two histogram pairs in h=[5,0,4 0], x∈{a,b,c,d} in order to avoid confliction. That is, it first uses the histogram pair with larger absolute feature values, then uses the histogram pair with smaller absolute feature values. In this example, we first embed data into the right histogram pair, then into the left histogram pair. The to-be-embedded bit sequence D=[0,1,0,0,1,0,1,1,0] is separated into two parts accordingly. That is, we first embed the front portion of data $D_1$=[0,1,0,0] into the histogram pair at the right side h=[4,0], x∈{c,d}, resulting in the corresponding samples $X_1$=[c,d,c,c]. Then, we embed the remaining data $D_2$=[1, 0, 1, 1, 0] into the left histogram pair h=[5,0], x∈{a,b}, resulting in the corresponding samples $X_2$=[b,a,b,b,a]. After Loop2, the histogram becomes h=[2,3,3,1] and the samples become X=[b,c,a,b,d,b,c,c,a], FIG. 2(d). The embedding capacity in Loop 2 is $C_2$=L=9 bits.

The total capacity after two embedding loops is C=18 bits. After two embedding loops, histogram changes from h=[9,0,0,0] to h=[2,3,3,1]. It is observed that the histogram has changed from rather sharp ([9,0,0,0]) to relatively flat ([2,3,3,1]).

The principles of thresholding are discussed in the following paragraphs. Histogram pair based lossless data hiding seeks not only higher embedding capacity but also higher visual quality of stego images measured by, say, PSNR (peak signal noise ratio). For instance, we may embed data with sufficient payload for annotation (such as caption) or for security (such as authentication) with reversibility as well as the highest possible PSNR of the stego image with respect to the cover image.

In the background art, it was thought that one way to improve the PSNR is to use only a part of JPEG coefficients with small absolute values. In doing so, we need the so-called thresholding technique. The thresholding method is to first set a threshold T, then embed data into those JPEG coefficients, x, with $|x| \leq T$. That is, it does not embed data into the JPEG coefficients with $|x| > T$. In addition, it makes sure that the small JPEG coefficients after data embedding will not conflict (will not be confused) with the large JPEG coefficients with ($|x| > T$). That is, for the JPEG coefficients satisfying $|x| \leq T$, histogram pair based data embedding is applied. It requires that after data embedding, the coefficients between $-T \leq x \leq T$ will be separable from the coefficients with $|x| > T$. The simple thresholding will divide the whole histogram into two parts: 1) the data-to-be embedded region, where the JPEG coefficients absolute value is small; and 2) no data-to-be embedded region named end regions, where the JPEG coefficients' absolute value is large.

Our experimental works have indicated that the smallest threshold T does not necessarily lead to the highest PSNR for a given data embedding capacity. Instead, it is found that for a given data embedding capacity there is an optimum value of T. This can be justified as follows. If a smaller threshold T is selected, the number of coefficients with $|x| > T$ will be larger. This implies that more coefficients with $|x| > T$ need to be moved away from 0 in order to create histogram pair(s) to losslessly embed data. This may lead to a lower PSNR and more side information (hence smaller embedding capacity). Therefore in embodiments of the invention, optimum histogram pair lossless embedding, and the best threshold T for a given data embedding capacity is selected to achieve the highest PSNR. Discussion about the optimum parameters and experimental results are further discussed below.

FIG. 3A to FIG. 3C is an example for multiple histogram pairs. FIG. 3A is the original image and the corresponding histogram. Since the bit stream length is 4, it is not enough to rely on the histogram h(T)=3 of one single T (T=2). Hence the new T sequence is x=T, S=-T]. Now in FIG. 3A, T=2; S=-2 produce two histogram pairs. After shifting the edge part of the histogram to the outer, the new image and the histogram is presented in FIG. 3B. Now it produces two histogram pair <h(2)=3,h(3)=0> and <h(-3)=0,h(-2)=1>. Similar as the case of one histogram pair, after data embedding, the embedded image and its corresponding histogram are shown in FIG. 3C.

The following is a discussion of maximum data embedding capacity. When the stop point S is negative, then the capacity is:

$$\sum_{-T}^{S} h(x) + \sum_{-S}^{T} h(x).$$

It produces 2(T−|S|+1) histogram pairs. When the stop point S is positive, the capacity is $$\sum_{-T}^{-S-1} h(x) + \sum_{S}^{T} h(x).$$

It produces 2(T−|S|+1)−1 histogram pairs.

In addition, when the stop point S is 0, the capacity is:

$$\sum_{-T}^{-1} h(x) + \sum_{0}^{T} h(x) = \sum_{-T}^{T} h(x).$$

It produces 2T histogram pairs. When T includes all the histogram value, in that case, the capacity is largest. It equals the integral of the histogram.

The maximum PSNR is discussed in the following paragraphs. When threshold T is small, the capacity is also small. Experimental results demonstrate that when the threshold T is large, it will increase the PSNR. Hence, if the length of to-be-embedded bit stream is fixed, we can get the highest PSNR and its corresponding threshold T through experiments.

An example of a histogram pair based lossless data embedding is discussed in the following paragraphs. In this example, the to-be-embedded bit sequence D=[1 10 001] has six bits and will be embedded into an image by using the proposed histogram pair scheme with threshold T=3, and stop value S=2. The dimensionality of the image is 5×5, as shown in FIG. 2E(a). The image has 12 distinct feature (grayscale) values, i.e., x∈{−5,−4,−3,−2,−1,0,1,2,3,4,5,6}. The grayscale values of this image have the histogram $h_0$=[0,1,2,3,4,6,3,3, 1,2,0,0] (as shown in 1$^{st}$ row of FIG. 2F). As said before, for x≧0, the histogram pair is of form h=[m,0], for x<0, the histogram pair is h=[0,n]. The second row of FIG. 2F is expanded image histogram: $h_1$ (expanded), it has three histogram pairs. The first histogram pair is in the far-right-hand side h=[1,0]; the second histogram pair is in the left-hand side h=[0,2]; the third histogram pair is in the right-hand side near the center h=[3,0]. The third row of FIG. 2F is the image histogram after data embedding; $h_2$ (bits embedded).

FIG. 2F and Table 1 use red line square to mark the third histogram pair. The first histogram pair [1,0] is used to embed the 1$^{st}$ bit 1, the second histogram pair [0,2] is used to embed the next two bits 1,0, and the third histogram pair [3,0] is used to embed three bits: 0,0,1. During expanding, we 1$^{st}$ making h(4)=0, then making h(−4)=0, finally making h(3)=0. During each zero-point creation the histogram shifting towards one of two (left and right) ends is carried out, the resultant histogram becomes $h_1$=[1,0,2,3,4,6,3,3,0,1,0,2] (refer to FIG. 2E(c) and 2$^{nd}$ row of FIG. 2F). There histogram pairs are thus produced: in the right-most h=[1,0], in the left h=[0,2] and in the right (near center) h=[3,0].

After data embedding with bit sequence D=[1 10 001] with the selected scanning order (from right to left and from top to bottom), the histogram becomes $h_2$=[1,1,1,2,4,6,3,2,1,0,1,2] (refer to FIG. 2E(c) and 3$^{rd}$ row of FIG. 2F). The three histogram pairs changed: in the right most from h=[1,0] to h=[0,1], in the left from h=[0,2] to h=[1,1], and in the right (near center) from h=[3,0] to h=[2,1].

TABLE 1.0

| | Example of histogram pair based data embedding with T = 3, S = 2, D = [1 10 001] | | | | | | | | | | | |
|---|---|---|---|---|---|---|---|---|---|---|---|---|
| 1 | X | −5 | −4 | −3 | −2 | −1 | 0 | 1 | 2 | 3 | 4 | 5 | 6 |
| 2 | $h_0$ (original) | 0 | 1 | 2 | 3 | 4 | 6 | 3 | 3 | 1 | 2 | 0 | 0 |
| 3 | $h_1$ (expanded) | 1 | 0 | 2 | 3 | 4 | 6 | 3 | 3 | 0 | 1 | 0 | 2 |
| 4 | $h_2$ (bits embedded) | 1 | 1 | 1 | 2 | 4 | 6 | 3 | 2 | 1 | 0 | 1 | 2 |
| 5 | embedded (ordering) | no embedding | [1 0] embedded (second) | | | no embedding | | | [001] embedded (third) | [1] embedded (first) | | no embedding |

After data embedding, not only the image pixel values but also three histogram pairs have been changed. For example, embedding the last three bits 0,0,1 causes the histogram pair at the right-hand side (near center) to change from h=[3,0] to h=[2,1], and three image pixel values marked with small rectangles (in red) to change from [2,2,2] to [2,2,3] (refer to FIG. 2E(c) and 3$^{rd}$ row of FIG. 2F). Through this example, it becomes clear that the threshold can also be viewed as the starting point to implement histogram pair lossless data hiding.

Formulae of lossless data hiding based on histogram pairs are discussed in the following paragraphs. The proposed method divides the whole histogram into three parts: (1) the part where data to be embedded; (2) central part—no data embedded and the absolute value of coefficients is small; (3) end part—no data embedded and the absolute value of coefficients is large. The whole embedding and extraction procedure can be expressed by the formulae in Table 2 below.

In Table 2, T is selected threshold, i.e., start position, S is stop position, x is feature (JPEG coefficient) values before embedding, x' is feature values after embedding, u(S) is unit step function (when S≧0; u(S)=1, when S<0; u(S)=0), ⌊x⌋ rounds x to the largest integer not larger than x.

TABLE 2

Formulae of lossless data hiding based on histogram pairs

| parts of histogram | Embedding | | Recovering | |
|---|---|---|---|---|
| | after embedding | condition | after recovering | condition |
| Data to be embedded region (right side) (positive or zero) | x' = 2x + b − |S| | |S| ≤ x ≤ T | x = ⌊(x' + |S|)/2⌋, b = x' + |S| − 2x | |S| ≤ x' ≤ 2T − 1 − |S| |
| Data to be embedded region (left side) (negative) | x' = 2x − b + |S| + u(S) | −T ≤ x ≤ − |S| − u(S) | x = ⌊(x' − |S| − u(S) + 1)/2⌋  b = x' − |S| − u(S) − 2x | −2T − 1 + |S| + u(S) ≤ x' ≤ −|S| − u(S) |
| Central part (small absolute value) | x' = x | −|S| − u(S) < x < |S| | x = x' | −|S| − u(S) < x' < |S| |
| Right edge part (positive) | x' = x + T + 1 − |S| | x > T | x = x' − T − 1 + |S| | x' > 2T + 1 − |S| |
| Left edge part (negative) | x' = x − T − 1 + |S| + u(S) | x < − T | x = x' + T + 1 − |S| − u(S) | if x' < −2T − 1 + |S| + u(S) |

Moreover, the formulae corresponding to the above example are listed in Table 3 below.

TABLE 3

Formulae of third example (T = 3; S = +2, 6 bit data D = [1 10 001])

| | Embedding | | Recovering | |
|---|---|---|---|---|
| | after embedding | condition | after recovering | condition |
| right to-be-embedded | x' = 2x + b − 2  b = 0: x' = [2, 4]  b = 1: x' = [3, 5] | if 2 ≤ x ≤ 3  b = 0: x = [2, 3]  b = 1: x = [2, 3] | x = floor((x' + 2)/2),  b = x' + 2 − 2x  b = 0: x = [2, 3]  b = 1: x = [2, 3] | if 2 ≤ x' ≤ 5  b = 0: x' = [2, 4]  b = 1: x' = [3, 5] |
| left to-be-embedded | x' = 2x − b + 3  b = 0: x' = [−3]  b = 1: x' = [−4] | if −3 ≤ x ≤ −3  b = 0: x = [−3]  b = 1: x = [−3] | x = floor((x' − 2)/2),  b = x' − 3 − 2x  b = 0: x = [−3]  b = 1: x = [−3] | if −4 ≤ x' ≤ −3  b = 0: x' = [−3]  b = 1: x' = [−4] |
| central | x' = x  x' = [−2, −1, 0, 1] | if −2 < x < 2  x = [−2, −1, 0, 1] | x = x'  x = [−2, −1, 0, 1] | if −2 − u(S) < x' < |S|  x' = [−2, −1, 0, 1] |
| right end | x' = x + 2  x' = [6] | if x > 3  x = [4] | x = x' − 2 x = [4] | if x' > 5 x' = [6] |
| left end | x' = x − 1  x' = [−5] | if x < −3  x = [−4] | x = x' + 1 x = [−4] | if x' < −4  x' = [−5] |

The selection of JPEG coefficients (i.e., JPEG quantized 8×8 Block DCT Coefficients) used for lossless data hiding is discussed in the following paragraph. In order to make data embedding less perceivable and make hidden data more robust, we may choose lower- and mid-frequency coefficients to embed data in the implementation of our invented technology. Among all of the JPEG coefficients, we determined the part of JPEG coefficients that has the best performance. In particular, we scan all of JPEG quantized 8×8 block DCT coefficients in the zigzag way to produce the histogram and data is embedded through histogram pairs based scheme as described above.

FIG. 4A to FIG. 4C show three regions of selected JPEG coefficients for data embedding. Experimental results in terms of PSNR of the stego images with respect to thresholds T when embedding of 500 bits into these different parts of the JPEG coefficients are shown in FIG. 5, FIG. 6, and FIG. 7, respectively. Data was embed in the region of {16, 36} in FIG. 4A, {4,36} in FIG. 4B and {16,49} in FIG. 4C of the DCT coefficients. Since the histogram of the DCT coefficients in {16, 36} and {16,49} are more concentrated, the maximum shown threshold T value in FIG. 4A to FIG. 4C is taken as 15. On the other hand, for {4, 36} (i.e., FIG. 4A), the maximum shown threshold T value is taken as 40. In general, the region of {4,36} appears to bring out better performance.

The results of our analysis of Lossless Data Hiding in JPEG Image Files produced by embodiments of the invention are discussed below. Some experiments on JPEG images with Q-factor equal 80 were done to evaluate the performance of embodiments of the invention. In particular, the test images used are: Lena.jpg (512×512), Barbara.jpg (512×512) and Baboon.jpg (512×512). The data is embedded in the JPEG coefficients in the region of {4, 36}. The experimental results are presented in Table 4 below.

TABLE 4

Lossless data hiding in three commonly used 512 × 512 JPEG Images with Q-factor 80 and the region of selected region of JPEG coefficients R = {4, 36}.

|  |  | 0.0004 | 0.0011 | 0.0019 | 0.003 | 0.0038 | 0.0114 |
|---|---|---|---|---|---|---|---|
|  | Payload bpp (bits) | (100) | (300) | (500) | (800) | (1000) | (3000) |
| Lena | PSNR | 58.4707 | 53.7209 | 52.6613 | 51.0275 | 49.8880 | 44.9344 |
|  | T(begin) | 12 | 9 | 5 | 6 | 5 | 2 |
|  | S(stop) | 12 | −9 | 5 | −6 | −5 | −2 |
|  | time(sec) | 0.182 | 0.373 | 0.179 | 0.382 | 0.375 | 0.342 |
|  | JPEG(bit) | 37956 | 37980 | 38024 | 38119 | 38120 | 38913 |
| Baboon | PSNR | 58.2083 | 53.1640 | 51.6615 | 49.4362 | 48.4424 | 43.2057 |
|  | T(begin) | 19 | 16 | 14 | 8 | 10 | 5 |
|  | S(stop) | 19 | −16 | −14 | 8 | −10 | −5 |
|  | time(sec) | 0.192 | 0.44 | 0.363 | 0.194 | 0.387 | 0.414 |
|  | JPEG(bit) | 78696 | 78675 | 78771 | 78735 | 78776 | 79387 |
| Barbara | PSNR | 58.3384 | 53.3831 | 51.2756 | 48.5166 | 48.3079 | 43.5953 |
|  | T(begin) | 13 | 11 | 9 | 7 | 7 | 4 |
|  | S(stop) | 13 | −11 | −9 | −7 | −7 | −4 |
|  | time(sec) | 0.18 | 0.372 | 0.552 | 0.364 | 0.404 | 0.387 |
|  | JPEG(bit) | 48361 | 48406 | 48406 | 48483 | 48555 | 48678 |
|  | Payload bpp (bits) | 0.0191 (5000) | 0.1 (26214) | 0.2 (52429) | 0.3 (78643) | 0.4 (104858) | 0.5 (131072) |
| Lena | PSNR | 44.4357 | 36.5374 | 32.5016 | 30.9442 | 29.7305 | 27.6371 |
|  | T(begin) | 2 | 2 | 0 | 0 | 1 | 6 |
|  | S(stop) | −2 | −1 | 0 | 0 | 0 | 0 |
|  | time(sec) | 0.367 | 0.745 | 0.187 | 0.204 | 0.597 | 2.474 |
|  | JPEG(bit) | 38913 | 42884 | 52486 | 57733 | 60792 | 65090 |
| Baboon | PSNR | 41.5645 | 33.2079 | 27.8094 | 27.1292 | 24.6459 | 21.8980 |
|  | T(begin) | 4 | 1 | 1 | 1 | 3 | 13 |
|  | S(stop) | −4 | −1 | 0 | 0 | 0 | 0 |
|  | time(sec) | 0.417 | 0.671 | 0.623 | 0.592 | 1.571 | 5.392 |
|  | JPEG(bit) | 79387 | 84610 | 91659 | 94485 | 98173 | 100922 |
| Barbara | PSNR | 40.2392 | 33.8112 | 31.8271 | 30.5232 | 28.5581 | 24.8663 |
|  | T(begin) | 1 | 0 | 0 | 0 | 1 | 7 |
|  | S(stop) | 1 | 0 | 0 | 0 | 0 | 0 |
|  | time(sec) | 0.176 | 0.171 | 0.193 | 0.204 | 0.6120 | 2.941 |
|  | JPEG(bit) | 49903 | 57623 | 62525 | 67062 | 70639 | 74112 |

For the 512×512 JPEG Lena images with different Q-factors (30, 40, 50, 60, 70, 80, 90, 100), the experimental results when 1000 bits are embedded into JPEG coefficients in the range of {4,36} are listed in Table 5 below.

TABLE 5

Experimental results with 1000 bits embedded into 512 × 512 Lena JPEG Image (0.0038 bpp) with various Q-factors (the JPEG coefficient region selected for data embedding is R = {4, 36}).

|  | Q-factors | | | | | | | |
|---|---|---|---|---|---|---|---|---|
|  | 30 | 40 | 50 | 60 | 70 | 80 | 90 | 100 |
| PSNR | 41.7598 | 44.5994 | 45.3630 | 46.0381 | 47.9433 | 49.8880 | 52.9991 | 58.2008 |
| T | 2 | 2 | 2 | 2 | 4 | 5 | 7 | 9 |
| S | −2 | 2 | 2 | 2 | −4 | −5 | −7 | 9 |
| Time (sec) | 0.337 | 0.179 | 0.185 | 0.1841 | 0.364 | 0.375 | 0.392 | 0.358 |
| Original image file size (bits) | 15,159 | 18,027 | 20,919 | 24,076 | 29,294 | 37,937 | 59,197 | 162,247 |
| Image file size after data embedding (bits) | 15,423 | 18,216 | 21,142 | 24,359 | 29,403 | 38,120 | 59,419 | 162,437 |
| Image file size increase after data embedding (bits) | 264 | 189 | −777 | 283 | 109 | −817 | 222 | 190 |

TABLE 5-continued

Experimental results with 1000 bits embedded into 512 × 512 Lena JPEG Image (0.0038 bpp) with various Q-factors (the JPEG coefficient region selected for data embedding is R = {4, 36}).

| | Q-factors | | | | | | | |
|---|---|---|---|---|---|---|---|---|
| | 30 | 40 | 50 | 60 | 70 | 80 | 90 | 100 |
| Image file size increase after data embedding (%) | 1.7% | 1.0% | 1.1% | 1.2% | 0.4% | 0.5% | 0.4% | 0.1% |

In the background art reference entitled: "Lossless data embedding with file size preservation," by Fridrich et al. discussed above, the highest payload reported in their experimental results on 50 images was 0.0176 bpp. In contrast, as the experimental results indicated Table 4 and Table 5 suggest, for all of three commonly used images, embodiments of the invention can easily embed 0.0191, 0.1, 0.2, 0.3, 0.4, and 0.5 bpp. That is, embodiments of the invention can embed much more data into JPEG images than the background art.

In addition, embodiments of the invention can keep data-size increases unnoticeable (e.g., when compared with the original JPEG image (before data embedding)). Specifically, when embedding 1000 bits to three commonly used JPEG images with Q-factor ranges from 30 to 100, the image size increase after embedding ranges from 1.7% (264 bits) to 0.1% (190 bits).

Further, The PSNR versus payload of these three images is shown from FIG. 8 to FIG. 11 and FIG. 12 to FIG. 26 is some images after embedding different amount of data (i.e., small payload and large payload). These figures indicate that the embodiments of invention work well with JPEG images with Q-factor equal 80.

The advantages of embodiments of the invention over the background art include, but are not limited to:
 a. the histogram pair based lossless data hiding technique can be applied to JPEG quantized 8×8 block DCT coefficients, and the I-frame of MPEG videos;
 b. the selection of optimum threshold and optimum JPEG coefficient region for data embedding can further improve the PSNR of stego images with a given payload;
 c. the histogram pair JPEG image lossless data hiding technique does not noticeably increase the size of JPEG image file;
 d. specifically, when 1000 bits are embedded into 512×512 Lena JPEG image (0.0038 bpp) with a Q-factor ranging from 30 to 100, the PSNR of the resultant stego images ranges from 41 dB to 58 dB;
 e. further, before and after the data embedding, the increase of the JPEG file size ranges from 1.7% to 0.1%;
 f. the amount of image-file-size increase ranges from 264 bits to 190 bits, which indicate satisfactory performance; and
 g. compared to the background art, it appears that embodiments of the invention can achieve higher payload.

Moreover, FIG. 27 shows a plot of the curve of PSNR of images with hidden data with respect to the original images versus the varying Q-factors. In particular, FIG. 27 indicates that embodiments of the present invention also work for different Q-factors well.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example. Likewise, an embodiment may be implement as a system, or as any combination of components such as computer systems, mobile and/or other types of communication systems and other well known electronic systems.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:
1. A method for embedding data into a JPEG-encoded image, comprising:
 deriving from the JPEG-encoded image a histogram of values of JPEG image coefficients, the histogram having a frequency associated with each value;

setting a threshold value, T, so that a number of JPEG image coefficients whose values lie in the range from −T to T is greater than a number of bits to be embedded in the image;

identifying or creating at least one histogram pair within the range of values from −T to T, wherein a histogram pair is a pair of neighboring values in the histogram for which one of the histogram frequencies is zero and the other is non-zero;

for at least one JPEG image coefficient having a value corresponding to the non-zero frequency of the histogram pair, modifying the image coefficient to have the value of the histogram pair associated with the zero frequency if a data bit to be embedded has a first bit value selected from the set $\{0,1\}$ and not modifying the image coefficient if the data bit to be embedded has a second bit value, different from the first bit value, selected from the set $\{0,1\}$, to obtain at least one processed image coefficient; and outputting a processed image including the at least one processed image coefficient;

wherein the above operations are to be performed using one or more processing devices.

2. The method of claim 1, wherein creating a histogram pair comprises modifying one or more of the JPEG image coefficients to provide a shift in the histogram to obtain at least one frequency equal to zero for at least one histogram value.

3. The method of claim 1, wherein creating a histogram pair comprises modifying one or more of the JPEG image coefficients whose values lie in the range from −T to T to provide a shift in the histogram to obtain at least one frequency equal to zero for at least one histogram value in the range from −T to T.

4. The method of claim 1, wherein deriving the histogram of values of JPEG image coefficients comprises entropy decoding received image information.

5. The method of claim 1, wherein outputting the processed image comprises entropy coding the JPEG image coefficients including the at least one processed image coefficient.

6. A method for extracting data embedded in an image, comprising:

deriving from the image a histogram of values of image coefficients having a frequency associated with each value;

beginning at a first histogram value, obtaining one or more data bits based on the histogram frequencies associated with a pair of histogram values comprised of the first histogram value and an immediately adjacent histogram value, until the histogram frequency associated with the first histogram value or with the immediately adjacent histogram value becomes zero;

shifting the histogram values on a side of the pair of histogram values closer to the histogram value of the pair of histogram values whose associated frequency becomes zero by one unit, so as to be adjacent to histogram value of the pair of histogram values whose frequency is non-zero; and outputting the one or more data bits;

wherein the above operations are to be performed using one or more processing devices, and wherein the first histogram value and a number are received in conjunction with the image, wherein the number corresponds to a number of embedded data bits.

7. The method of claim 6, wherein the method further comprises:

following obtaining one or more data bits, determining if there remain any further bits to be extracted from the image;

if there remain any further bits to be extracted, decrementing the first histogram value and negating the result, to obtain a second histogram value, and repeating said obtaining and said shifting using the second histogram value.

8. The method of claim 6, wherein deriving the histogram of values of image coefficients comprises entropy decoding received image information.

9. A product including a non-transitory computer-readable medium having instructions stored thereon that, upon execution by a computing device, cause the computing device to perform operations for embedding data into a JPEG-encoded image, comprising:

deriving from the JPEG-encoded image a histogram of values of JPEG image coefficients, the histogram having a frequency associated with each value;

setting a threshold value, T, so that a number of JPEG image coefficients whose values lie in the range from −T to T is greater than a number of bits to be embedded in the image;

identifying or creating at least one histogram pair within the range of values from −T to T, wherein a histogram pair is a pair of neighboring values in the histogram for which one of the histogram frequencies is zero and the other is non-zero;

for at least one JPEG image coefficient having a value corresponding to the non-zero frequency of the histogram pair, modifying the JPEG image coefficient to have the value of the histogram pair associated with the zero frequency if a data bit to be embedded has a first bit value selected from the set $\{0,1\}$ and not modifying the JPEG image coefficient if the data bit to be embedded has a second bit value, different from the first bit value, selected from the set $\{0,1\}$, to obtain at least one processed image coefficient; and outputting a processed image including the at least one processed image coefficient.

10. The product of claim 9, wherein creating a histogram pair comprises modifying one or more of the JPEG image coefficients to provide a shift in the histogram to obtain at least one frequency equal to zero for at least one histogram value.

11. The product of claim 9, wherein creating a histogram pair comprises modifying one or more of the JPEG image coefficients whose values lie in the range from −T to T to provide a shift in the histogram to obtain at least one frequency equal to zero for at least one histogram value in the range from −T to T.

12. The product of claim 9, wherein deriving the histogram of values of JPEG image coefficients comprises entropy decoding received image information.

13. The product of claim 9, wherein outputting the processed image comprises entropy coding the JPEG image coefficients including the at least one processed image coefficient.

14. A product including a non-transitory computer-readable medium having instructions stored thereon that, upon execution by a computing device, cause the computing device to perform operations for extracting data embedded in an image, comprising:

deriving from the image a histogram of values of image coefficients having a frequency associated with each value;

beginning at a first histogram value, obtaining one or more data bits based on the histogram frequencies associated with a pair of histogram values comprised of the first histogram value and an immediately adjacent histogram value, until the histogram frequency associated with the first histogram value or with the immediately adjacent histogram value becomes zero;

shifting the histogram values on a side of the pair of histogram values closer to the histogram value of the pair of histogram values whose associated frequency becomes zero by one unit, so as to be adjacent to histogram value of the pair of histogram values whose frequency is non-zero; and outputting the one or more data bits, wherein the first histogram value and a number are received in conjunction with the image, wherein the number corresponds to a number of embedded data bits.

15. The product of claim 14, wherein the operations further comprise:

following obtaining one or more data bits, determining if there remain any further bits to be extracted from the image;

if there remain any further bits to be extracted, decrementing the first histogram value and negating the result, to obtain a second histogram value, and repeating said obtaining and said shifting using the second histogram value.

16. The product of claim 14, wherein deriving the histogram of values of image coefficients comprises entropy decoding received image information.

17. An apparatus for embedding data into a JPEG-encoded image, comprising:

means for deriving from the JPEG-encoded image a histogram of values of JPEG image coefficients, the histogram having a frequency associated with each value;

means for setting a threshold value, T, so that a number of JPEG image coefficients whose values lie in the range from −T to T is greater than a number of bits to be embedded in the image;

means for identifying or creating at least one histogram pair, with the range of values from −T to T, wherein a histogram pair is a pair of neighboring values in the histogram for which one of the histogram frequencies is zero and the other is non-zero;

means for, for at least one JPEG image coefficient having a value corresponding to the non-zero frequency of the histogram pair, modifying the JPEG image coefficient to have the value of the histogram pair associated with the zero frequency if a data bit to be embedded has a first bit value selected from the set {0,1} and not modifying the JPEG image coefficient if the data bit to be embedded has a second bit value, different from the first bit value, selected from the set {0,1}, to obtain at least one processed image coefficient; and means for outputting a processed image including at least one processed image coefficient.

18. The apparatus of claim 17, wherein the means for creating a histogram pair comprises means for modifying one or more of the JPEG image coefficients to provide a shift in the histogram to obtain at least one frequency equal to zero for at least one histogram value.

19. The apparatus of claim 17, wherein the means for creating a histogram pair comprises means for modifying one or more of the JPEG image coefficients whose values lie in the range from −T to T to provide a shift in the histogram to obtain at least one frequency equal to zero for at least one histogram value in the range from −T to T.

20. The apparatus of claim 17, wherein the means for deriving the histogram of values of JPEG image coefficients comprises means for entropy decoding received image information.

21. The apparatus of claim 17, wherein the means for outputting the processed image comprises means for entropy coding the JPEG image coefficients including the at least one processed image coefficient.

22. An apparatus for extracting data embedded in an image, comprising:

means for deriving from the image a histogram of values of image coefficients, the histogram having a frequency associated with each value;

means for obtaining one or more data bits based on the histogram frequencies associated with a pair of histogram values comprising a first histogram value and an immediately adjacent histogram value, until the histogram frequency associated with the first histogram value or with the immediately adjacent histogram value becomes zero;

means for shifting the histogram values on a side of the pair of histogram values closer to the histogram value of the pair of histogram values whose associated frequency becomes zero by one unit, so as to be adjacent to histogram value of the pair of histogram values whose frequency is non-zero; and means for outputting the one or more data bits, wherein the first histogram value and a number are received in conjunction with the image, wherein the number corresponds to a number of embedded data bits.

23. The apparatus of claim 22, wherein the means for obtaining and means for shifting are further configured to:

after obtaining one or more data bits, determine if there remain any further bits to be extracted from the image; and if there remain any further bits to be extracted, decrement the first histogram value and negate the result, to obtain a second histogram value, and repeat said obtaining and said shifting using the second histogram value.

24. The apparatus of claim 22, wherein the means for deriving the histogram of values of image coefficients comprises means for entropy decoding received image information.

25. An apparatus, comprising:

at least one processing unit; and a storage medium coupled to the at least one processing unit, the storage medium having instructions stored thereon that, if executed by the at least one processing unit, cause the at least one processing unit to perform a set of operations for embedding data into a JPEG-encoded image, comprising:

deriving from the JPEG-encoded image a histogram of values of JPEG image coefficients, the histogram having a frequency associated with each value;

setting a threshold value, T, so that a number of JPEG image coefficients whose values lie in the range from −T to T is greater than a number of bits to be embedded in the image;

identifying or creating at least one histogram pair within the range of values from −T to T, wherein a histogram pair is a pair of neighboring values in the histogram for which one of the histogram frequencies is zero and the other is non-zero;

for at least one JPEG image coefficient having a value corresponding to the non-zero frequency of the histogram pair, modifying the image coefficient to have the value of the histogram pair associated with the zero frequency if a data bit to be embedded has a first bit value selected from the set {0,1} and not modifying the image coefficient if the data bit to be embedded has a second bit value, different from the first bit value, selected from the set {0,1}, to obtain at least one processed image coefficient; and outputting a processed image including the at least one processed image coefficient.

26. The apparatus of claim 25, wherein creating a histogram pair comprises modifying one or more of the JPEG image coefficients to provide a shift in the histogram to obtain at least one frequency equal to zero for at least one histogram value.

27. The apparatus of claim 25, wherein creating a histogram pair comprises modifying one or more of the JPEG image coefficients whose values lie in the range from −T to T to provide a shift in the histogram to obtain at least one frequency equal to zero for at least one histogram value in the range from −T to T.

28. The apparatus of claim 25, wherein deriving the histogram of values of JPEG image coefficients comprises entropy decoding received image information.

29. The apparatus of claim 25, wherein outputting the processed image comprises entropy coding the JPEG image coefficients including the at least one processed image coefficient.

30. An apparatus, comprising:
at least one processing unit; and
a storage medium coupled to the at least one processing unit, the storage medium having instructions stored thereon that, if executed by the at least one processing unit, cause the at least one processing unit to perform a set of operations for extracting data embedded in an image, comprising:
deriving from the image a histogram of values of image coefficients having a frequency associated with each value;
beginning at a first histogram value, obtaining one or more data bits based on the histogram frequencies associated with a pair of histogram values comprised of the first histogram value and an immediately adjacent histogram value, until the histogram frequency associated with the first histogram value or with the immediately adjacent histogram value becomes zero;
shifting the histogram values on a side of the pair of histogram values closer to the histogram value of the pair of histogram values whose associated frequency becomes zero by one unit, so as to be adjacent to histogram value of the pair of histogram values whose frequency is non-zero; and
outputting the one or more data bits,
wherein the first histogram value and a number are received in conjunction with the image, wherein the number corresponds to a number of embedded data bits.

31. The apparatus of claim 30, wherein the wherein the storage medium contains further instructions resulting in the operations further comprising:

following obtaining one or more data bits, determining if there remain any further bits to be extracted from the image;
if there remain any further bits to be extracted, decrementing the first histogram value and negating the result, to obtain a second histogram value, and repeating said obtaining and said shifting using the second histogram value.

32. The apparatus of claim 30, wherein deriving the histogram of values of image coefficients comprises entropy decoding received image information.

33. The method of claim 6, wherein the first histogram value corresponds to a last histogram value used to embed data in the image.

34. The method of claim 7, wherein the method further comprises:
following repeating said obtaining, determining if there remain any further bits to be extracted from the image;
if there remain any further bits to be extracted, negating the second histogram value, to obtain a third histogram value, and repeating said obtaining and said shifting using the third histogram value.

35. The product of claim 14, wherein the first histogram value corresponds to a last histogram value used to embed data in the image.

36. The product of claim 15, wherein the operations further comprise:
following repeating said obtaining, determining if there remain any further bits to be extracted from the image;
if there remain any further bits to be extracted, negating the second histogram value, to obtain a third histogram value, and repeating said obtaining and said shifting using the third histogram value.

37. The apparatus of claim 22, wherein the first histogram value corresponds to a last histogram value used to embed data in the image.

38. The apparatus of claim 23, wherein the means for obtaining and means for shifting are further configured to:
following repeating said obtaining, determining if there remain any further bits to be extracted from the image;
if there remain any further bits to be extracted, negating the second histogram value, to obtain a third histogram value, and repeating said obtaining and said shifting using the third histogram value.

39. The apparatus of claim 30, wherein the first histogram value corresponds to a last histogram value used to embed data in the image.

40. The apparatus of claim 31, wherein the wherein the storage medium contains further instructions resulting in the operations further comprising:
following repeating said obtaining, determining if there remain any further bits to be extracted from the image;
if there remain any further bits to be extracted, negating the second histogram value, to obtain a third histogram value, and repeating said obtaining and said shifting using the third histogram value.

* * * * *

UNITED STATES PATENT AND TRADEMARK OFFICE
CERTIFICATE OF CORRECTION

| | | |
|---|---|---|
| PATENT NO. | : 7,974,477 B2 | Page 1 of 1 |
| APPLICATION NO. | : 11/676399 | |
| DATED | : July 5, 2011 | |
| INVENTOR(S) | : Shi et al. | |

It is certified that error appears in the above-identified patent and that said Letters Patent is hereby corrected as shown below:

On the Title page, item (75), under "Inventors", Line 1, delete "Yun Qing" and insert -- Yun-Qing --.

On the Title page, item (57), under "Abstract", Line 9, delete "pairs." and insert -- pairs, --.

On Title Page 2, item (56), under "Other Publications", Line 4, delete "Pulic" and insert -- Public --.

Column 23, line 55, in Claim 31, delete "wherein the wherein the" and insert -- wherein the --.

Column 24, line 48, in Claim 40, delete "wherein the wherein the" and insert -- wherein the --.

Signed and Sealed this
Eighth Day of November, 2011

David J. Kappos
*Director of the United States Patent and Trademark Office*